United States Patent [19]

Wakabayashi et al.

[11] Patent Number: 4,874,836
[45] Date of Patent: Oct. 17, 1989

[54] THERMOPLASTIC WHOLLY AROMATIC POLYIMIDE ESTERS AND PROCESS FOR PRODUCING THE SAME

[75] Inventors: Makoto Wakabayashi; Kenichi Fujiwara; Hideo Hayashi, all of Chiba, Japan

[73] Assignee: Idemitsu Petrochemical Co., Ltd., Tokyo, Japan

[21] Appl. No.: 262,796

[22] Filed: Oct. 26, 1988

[30] Foreign Application Priority Data

Oct. 28, 1987 [JP] Japan .................... 62-270380
Jun. 2, 1988 [JP] Japan .................... 63-134484

[51] Int. Cl.$^4$ .................................. C08G 69/44
[52] U.S. Cl. ................................ 528/185; 528/170; 528/182; 528/184; 528/193; 528/348
[58] Field of Search ............... 528/170, 182, 184, 185, 528/193

[56] References Cited

U.S. PATENT DOCUMENTS

| | | | |
|---|---|---|---|
| 4,351,917 | 9/1982 | Calundann et al. | 528/185 |
| 4,351,918 | 9/1982 | Charbonneau et al. | 528/185 |
| 4,355,132 | 10/1982 | East et al. | 528/185 |

Primary Examiner—John Kight
Assistant Examiner—T. Mason
Attorney, Agent, or Firm—Antonelli, Terry & Wands

[57] ABSTRACT

Disclosed herein are a thermoplastic wholly aromatic polyimide ester consisting essentially of structural units represented by the general formulas I, II, III, and IV:

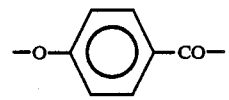

I

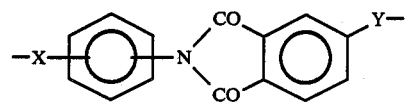

II

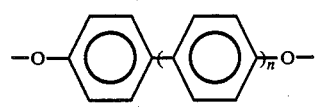

III

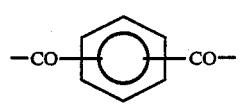

IV wherein X and Y are either —O— or —CO— and may be either identical with or different from each other, n is an integrer of 0 or 1, X group and imide group and imide group in unit II are present at para or meta position to each other, two carbonyl gorups in unit IV are present at para or meta position to each other, and each end of units I, II, III, and IV is bonded to another end trough ester bond, and wherein the polyimide ester has a melt viscosity of 1.0 to $1.0 \times 10^5$ Pa·s measured at a shear stress of 0.025 MPa and a temperature of 300° to 400° C.; and a process for producing the thermoplastic wholly aromatic polyimide ester.

10 Claims, 4 Drawing Sheets

THERMOPLASTIC WHOLLY AROMATIC POLYIMIDE ESTERS AND PROCESS FOR PRODUCING THE SAME

BACKGROUND OF THE INVENTION (a) Field of the Invention

The present invention relates to thermoplastic wholly aromatic polyimide esters which have excellent dimensional stability, and more particularly to novel polyimide esters capable of being suitably used for electric and electronic parts, etc. which require excellent dimensional stability and accuracy in both flow direction (machine direction: MD) and a direction making a right angle with the flow direction (transverse direction: TD).

(b) Description of the Related Art

In recent years, thermoplastic resins having extremely small coefficients of linear expansion in MD have come to be known. These resins are a series of resins called thermotropic liquid-crystalline polymers, and some examples of such resins include the wholly aromatic copolyesters disclosed in Japanese Patent Application Laid-open No. 54-77691, etc.

The above-mentioned copolyesters have small coefficients of linear expansion in MD but are of much the same coefficients of linear expansion in TD as those of common thermoplastic resins, and are therefore hardly sufficient in dimensional stability.

Polyimide esters containing both imide bonds and ester bonds in their molecules have been well known. For example, those having excellent, high heat resistance are disclosed in U.S. Pat. No. 3,542,731, those improved in heat resistance, mechanical properties, and processabilities in Japanese Patent Application Laid-open No. 58-67725, those having high moduluses of elasticity in Japanese Patent Application Laid-open No. 55-84326, those having toughness in Japanese Patent Application Laid-open No. 58-113222, and those having high rigidity in Japanese Patent Application Laid-open No. 60-4531. However, these polyimide esters are also hardly sufficient in dimensional stability.

SUMMARY OF THE INVENTION

An object of the present invention is to provide a novel, thermoplastic wholly aromatic polyimide ester having excellent dimensional stability and accuracy in both MD and TD and processes suitable for producing the same.

Another object of the present invention is to provide a wholly aromatic polyimide ester which due to its capability of undergoing injection molding and its excellent strength and heat resistance, are useful as materials for electric and electronic parts, etc.

The present inventors, as a result of their studies for solving the above-mentioned problems, have found the above objects can be attained by polyimide esters obtained by introducing certain imide groups in aromatic polyesters, and have eventually completed the present invention.

That is, the present invention provides a thermoplastic wholly aromatic polyimide ester having excellent dimensional stability and consisting essentially of structural units represented by the general formulas I, II, III, and IV:

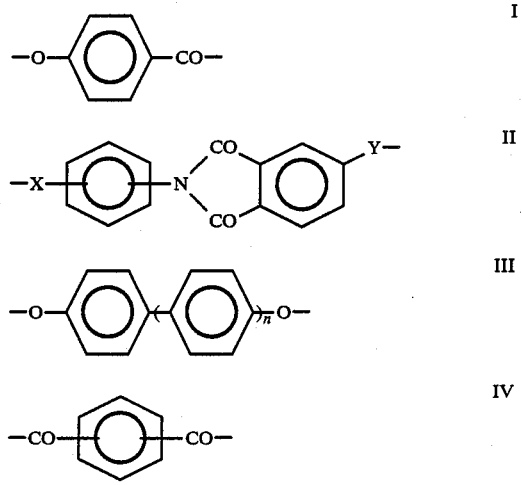

wherein X and Y are either —O— or —CO— and may be either identical with or different from each other, n is an integer of 0 or 1, X group and imide group in unit II are present at para or meta position to each other, two carbonyl groups in unit IV are present at para or meta position to each other, and each end of units I, II, III, and IV is bonded to another end through ester bond, and wherein the polyimide ester has a melt viscosity of 1.0 to $1.0 \times 10^5$ Pa·s (pascal·second) measured at a shear stress of 0.025 MPa (mega-pascal) and a temperature of 300 to 400° C.

The polyimide esters of the present invention have thermoplasticity and as well have excellent dimensional stability and accuracy in both MD and TD.

DESCRIPTION OF THE PREFERRED EMBODIMENT

Figure 1:
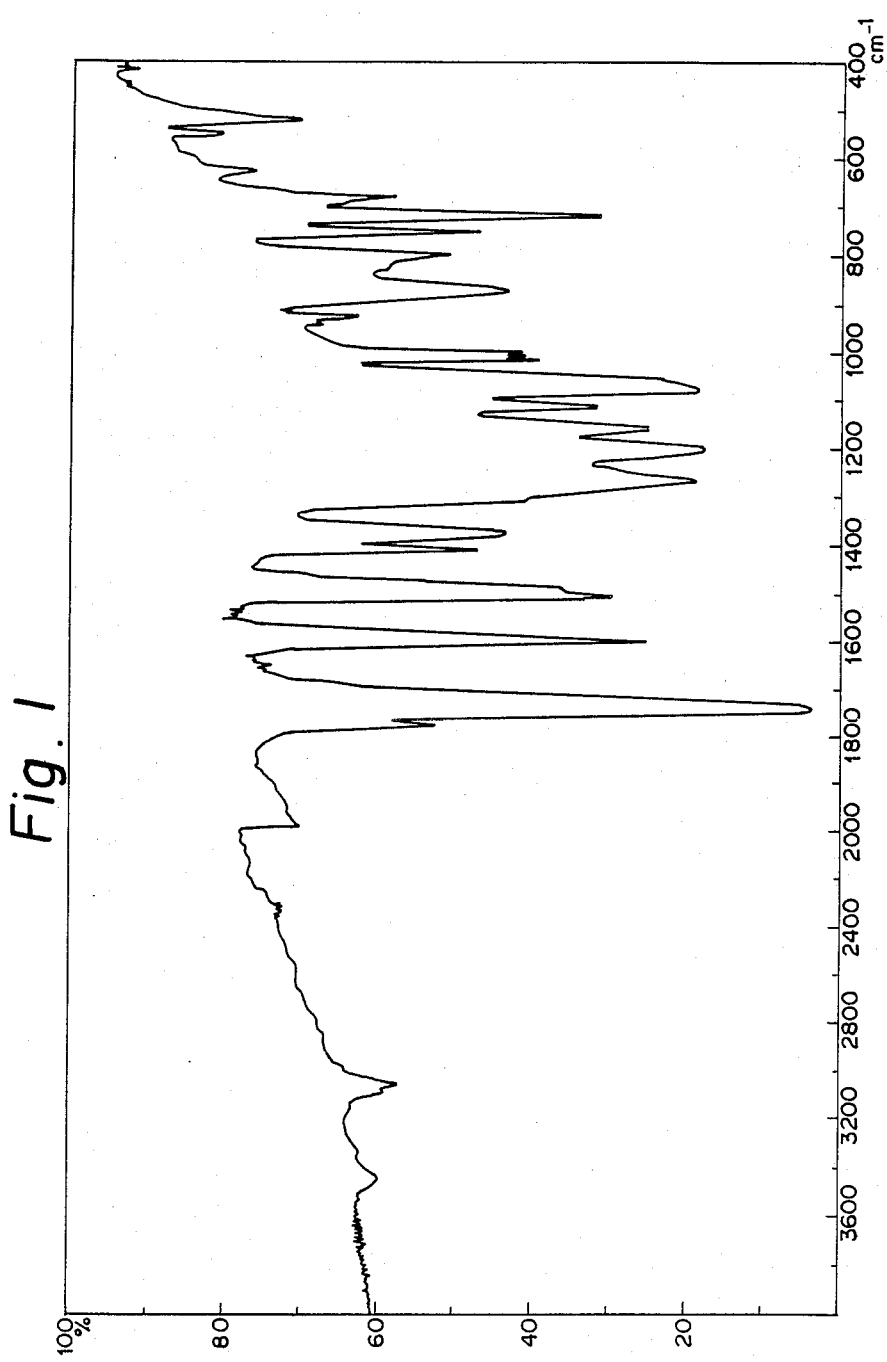
FIG. 1 is IR spectrum of the wholly aromatic polyimide ester obtained in Example 1.

The polyimide esters of the present invention consist essentially of the above described units I, II, III, and IV. With regard to the ratio of each of those structural units contained in the polyimide ester, it is preferred, in a case where X is —O— and Y is —CO—, that the mole ratio of (unit I+unit II):(unit III+unit IV) is 20:80 to 90:10, the mole ratio of unit I:unit II is 0.1:99.9 to 99.9:0.1, the mole ratio of unit III:unit IV is substantially 1:1, and the mole ratio of unit II:(unit I+unit III+unit IV) is 0.1:99.9 to 30:70, particularly preferably 0.2:99.8 to 20:80.

In a case where X is —CO— and Y is —CO—, it is preferred that the mole fraction of unit I is 20 to 80 mole %, the mole fraction of unit II is 0.1 to 30 mole %, the mole fraction of unit III is 10 to 40 mole %, and the mole fraction of unit IV is 0.1 to 40 mole %.

In a case where X is —O— and Y is —O—, the mole ratio of unit I:(unit II+unit III+unit IV) is 20:80 to 90:10, the mole ratio of unit II:unit III is 0.1:99.9 to 99.9:0.1, the mole ratio of (unit II+unit III):unit IV is substantially 1:1, and the mole ratio of unit II:(unit I+unit III+unit IV) is 0.1:99.9 to 30:70.

In a case where X is —CO— and Y is —O—, it is preferred that the mole ratio of (unit I+unit II):(unit III+unit IV) is 20:80 to 90:10, the mole ratio of unit I:unit II is 0.1:99.9 to 99.9:0.1, the mole ratio of unit III:unit IV is substantially 1:1, and the mole ratio of unit II:(unit I+unit III+unit IV) is 0.1:99.9 to 30:70.

If the mole ratios of the structural units are out of the range described above, the objective dimensional stability and accuracy will not be sufficiently attained. The preferred range of the mole ratio of the imidecontaining moiety and the other moieties, i.e. unit II:(unit I+unit III+unit IV) is 0.1:99.9 to 30:70, particularly preferably 0.2:99.8 to 20:80. If the mole fraction of unit II is less than 0.1 mole %, the dimensional uniformities in coefficients of linear expansion, coefficients of shrinkage, etc. will not be effectively improved and if it exceeds 30 mole %, some disadvantages such as decreased strength will be occur.

The polyimide esters of the present invention are thermoplastic resins having a melt viscosity of 1.0 to 1.0 ×10⁵ Pa·s measured at a shear stress of 0.025 MPa and a temperature of 300° to 400° C. and are therefore easily molded by injection molding, etc.

The polyimide esters of the present invention may be produced by, for example, the processes described below.

The polyimide esters of the present invention wherein X is —O— and Y is —CO— in the above general formula may be produced by reacting a compound Ia, a compound IIa, a compound IIIa, and a compound IVa represented by the general formulas respectively:

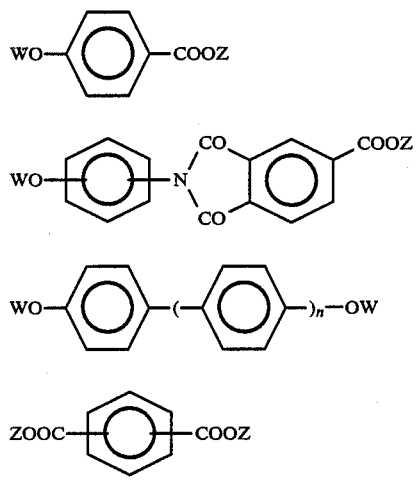

wherein n is an integer of 0 or 1, each W is independently selected from hydrogen or RCO—, R being, independently, a hydrocarbon group of 1 to 18 carbon atoms, each Z is independently selected from hydrogen or hydrocarbon groups of 1 to 18 carbon atoms, WO— group and imide group in compound IIa are present at para or meta position to each other, two carbonyl groups in compound IVa are present at para or meta position to each other, so that one or more compounds each represented by the general formula:

W—O—Z are eliminated; or by reacting a compound Ia, a compound IIb, a compound IIIa, and a compound IVa represented by the general formulas respectively:

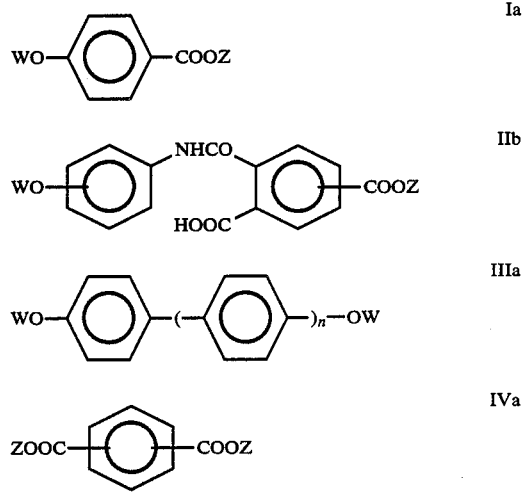

wherein n, W, and Z are as defined above, WO— group and amide group in compound IIb are present at para or meta position to each other, ZOOC— group and carboxyl group in compound IIb are present at para or meta position to each other, and two carbonyl groups in compound IVa are present at para or meta position to each other, so that compound IIb is imide-cyclized and one or more compounds represented by the general formula:

W—O—Z are eliminated.

Among the polyimide esters of the present invention wherein X is —O— and Y is —CO— in the above general formula, the preferred polyimide esters, wherein the mole ratio of (unit I+unit II):(unit III+unit IV) is 20:80 to 90:10, the mole ratio of unit I:unit II is 0.1:99.9 to 99.9:0.1, and the mole ratio of unit III:unit IV is substantially 1:1, may be produced according to the processes described above by reacting the compound Ia, compound IIa, compound IIIa, and compound IVa in such amounts that the mole ratio of (compound Ia+compound IIa):(compound IIIa+compound IVa) is 20:80 to 90:10, the mole ratio of compound Ia:compound IIa is 0.1:99.9 to 99.9:0.1, and the mole ratio of compound IIIa:compound IVa is substantially 1:1; or by reacting the compound Ia, compound IIb, compound IIIb, and compound IVa in such amounts that the mole ratio of (compound Ia+compound IIb):(compound IIIa+compound IVa) is 20:80 to 90:10, the mole ratio of compound Ia:compound IIb is 0.1:99.9 to 99.9:0.1. and the mole ratio of compound IIIa:compound IVa is substantially 1:1.

The polyimide esters of the present invention wherein X is —CO— and Y is —CO— in the above general formula may be produced by reacting a compound Ia, a compound IIc, a compound IIIa, and a compound IVa represented by the general formulas respectively:

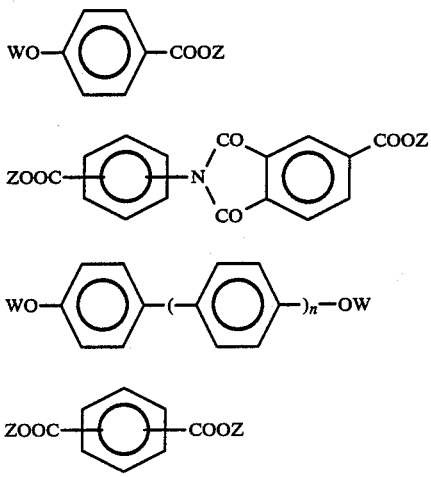

Ia

IIc

IIIa

IVa wherein n, W, and Z is as defined above, ZOOC— group and imide group in compound IIc are present at para or meta position to each other, and two carbonyl groups in compound IVa are present at para or meta position to each other, so that one or more compounds represented by the general formula:

W—O—Z are eliminated; or by reacting a compound Ia, a compound IId, a compound IIIa, and a compound IVa represented by the general formulas respectively:

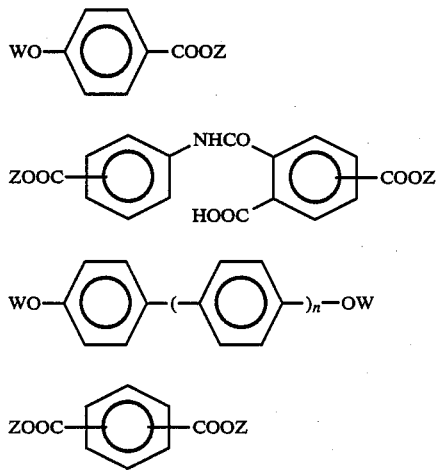

Ia

IId

IIIa

IVa wherein n, W, and Z are as defined above, the left-hand ZOOC— group and amide group in compound IId are present at para or meta position to each other, the other ZOOC— group and carboxyl group in compound IId are at para or meta position to each other, and two carbonyl groups in compound IVa are present at para or meta position to each other, so that compound IId is imide-cyclized and one or more compounds represented by the general formula:

W—O—Z are eliminated.

Among the polyimide esters of the present invention wherein X is —CO— and Y is —CO— in the above general formula, the preferred polyimide esters, wherein the mole fraction of unit I is 20 to 80 mole %, the mole fraction of unit II is 0.1 to 30 mole %, the mole fraction of unit III is 10 to 40 mole %, and the mole fraction of unit IV is 0.1 to 40 mole %, may be produced according to the processes described above by reacting the compound Ia, compound IIc, compound IIIa, and compound IVa in amounts of 20 to 80 mole % of compound Ia, 0.1 to 30 mole % of compound IIc, 10 to 40 mole % of compound IIIa, and 0.1 to 40 mole % of compound IVa; or by reacting the compound Ia, compound IId, compound IIIa, and compound IVa in amounts of 20 to 80 mole % of compound Ia, 0.1 to 30 mole % of compound IId, 10 to 40 mole % of compound IIIa, and 0.1 to 40 mole % of compound IVa.

The polyimide esters of the present invention wherein X is —O— and Y is —O— in the above general formula may be produced by reacting a compound Ia, a compound IIe, a compound IIIa, and a compound IVa represented by the general formulas respectively:

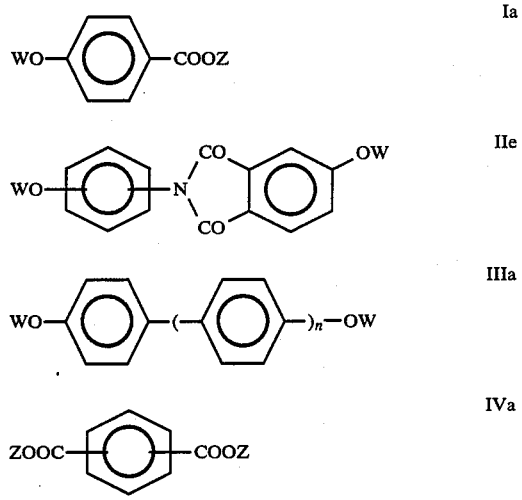

Ia

IIe

IIIa

IVa wherein n, W, and Z is as defined above, WO— group and imide group in compound IIe are present at para or meta position to each other, and two carbonyl groups in compound IVa are present at para or meta position to each other, preferably in such amounts that the mole ratio of compound Ia:(compound IIe+compound IIIa+compound IVa) is 20:80 to 90:10, the mole ratio of compound IIe:compound IIIa is 0.1:99.9 to 99.9:0.1, and the mole ratio of (compound IIe+ compound IIIa):-compound IVa is substantially 1:1, so that one or more compounds represented by the general formula:

W—O—Z are eliminated; or by reacting a compound Ia, a compound IIf, a compound IIIa, and a compound IVa represented by the general formulas respectively:

Ia

-continued

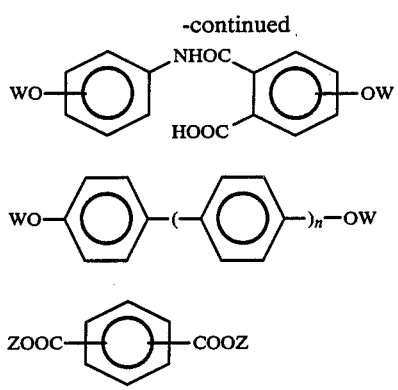
IIf

IIIa

IVa wherein n, W, and Z are as defined above, the left-hand WO— group and amide group in compound IIf are present at para or meta position to each other, the other WO— group and carboxyl group in compound IIf are present at para or meta position to each other, and two carbonyl groups in compound IVa are present at para or meta position to each other, preferably in such amounts that the mole ratio of compound Ia:(compound IIf+compound IIIa+compound IVa) is 20:80 to 90:10, the mole ratio of compound IIf:compound IIIa is 0.1:99.9 to 99.9:0.1, and the mole ratio of (compound IIf+compound IIIa):compound IVa is substantially 1:1, so that compound IIf is imide-cyclized and one or more compounds represented by the general formula:

W—O—Z are eliminated.

The polyimide esters of the present invention wherein X is —CO— and Y is —O— in the above general formula may be produced by reacting a compound Ia, a compound IIg, a compound IIIa, and a compound IVa represented by the general formulas respectively:

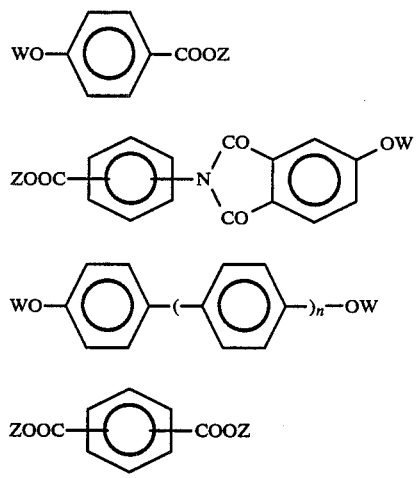

Ia

IIg

IIIa

IVa wherein n, W, and Z is as defined above, ZOOC— group and imide group in compound IIg are present at para or meta position to each other, and two carbonyl groups in compound IVa are present at para or meta position to each other, preferably in such amounts that the mole ratio of (compound Ia+compound IIg):(compound IIIa+compound IVa) is 20:80 to 90:10, the mole ratio of compound Ia:compound IIg is 0.1:99.9 to 99.9:0.1, and the mole ratio of compound IIIa:compound IVa is substantially 1:1, so that one or more compounds represented by the general formula:

W—O—Z are eliminated; or by reacting a compound Ia, a compound IIh, a compound IIIa, and a compound IVa represented by the general formulas respectively:

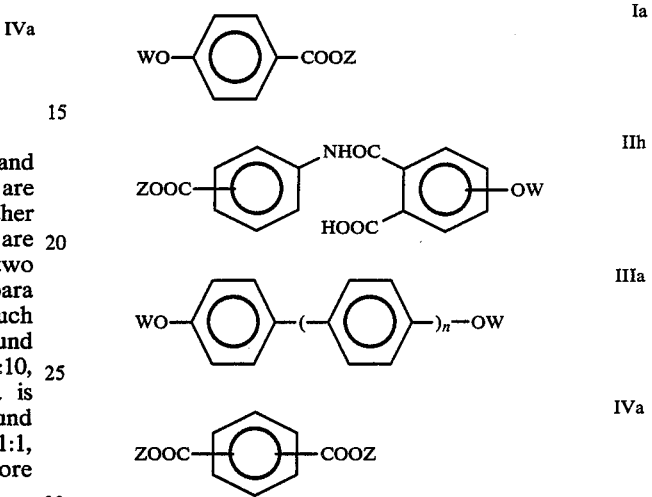

Ia

IIh

IIIa

IVa wherein n, W, and Z are as defined above, the ZOOC— group and amide group in compound IIh are present at para or meta position to each other, WO— group and carboxyl group in compound IIh are at para or meta position to each other, and two carbonyl groups in compound IVa are present at para or meta position to each other, preferably in such amounts that the mole ratio of (compound Ia+compound IIh):(compound IIIa+compound IVa) is 20:80 to 90:10, the mole ratio of compound Ia:compound IIh is 0.1:99.9 to 99.9:0.1, and the mole ratio of compound IIIa:compound IVa is substantially 1:1, so that compound IIh is imide-cyclized and one or more compounds represented by the general formula:

are eliminated.

The compounds Ia which may be used as the raw material in the present invention include para-hydroxybenzoic acid, the compounds obtained by acylating para-hydroxybenzoic acid with a derivative of RCOOH, R being as defined above, and the compounds obtained by esterifying para-hydroxybenzoic acid or the acylated compounds with a compound Z—OH, Z being as defined above. Among those, the preferred are para-hydroxybenzoic acid and para-acetoxybenzoic acid.

The compounds which may be used as the raw materials for providing unit II in the present invention include imide compounds prepared by various methods. For example, trimellitic anhydride, a derivative thereof, hydroxyphthalic anhydride or a derivative thereof represented by the following general formula:

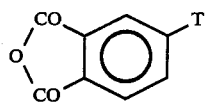

(A)

wherein T is —COOZ or —OW, Z and W being as defined above, is reacted with an aromatic amino compound represented by the following general formula:

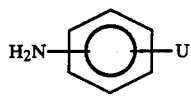

(B)

wherein U is —COOZ or —OW, W and Z being as defined above, and U— group and amino group are present at para or meta position to each other, to form an amic acid (compound IIb, IId, IIf or IIh) represented by the following general formula:

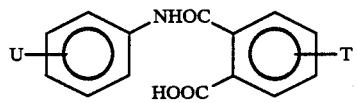

(C)

wherein U— group and amide group are present at para or meta position to each other and T— group and carboxyl group are present at para or meta position to each other, followed by cyclodehydrating the amic acid to form an imide compound (compound IIa, IIc, IIe or IIg) represented by the following general formula:

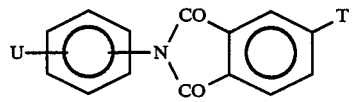

(D)

wherein U- group and imide group are present at para or meta position to each other.

The reaction described above of the compounds (A), i.e. trimellitic anhydride, derivatives thereof, hydroxyphthalic anhydride or derivatives thereof, easily proceeds by only contacting (A) and (B), preferably in a state of a solution thereof, to form a slightly soluble amic acid (C) which generally separates out as a precipitate. While the reaction proceeds sufficiently at room temperature, the suitable range of reaction temperature is −50° C. to 100° C., and generally, the reaction is carried out in a range of 0° to 80° C. Also, the reaction proceeds in a short time and does not generally require the presence of a particular catalyst.

Various methods may be employed for the cyclodehydration of the amic acids described above. Some examples of the methods which may be employed include (1) a method of cyclodehydration in the presence of a carboxylic anhydride, (2) a method of cyclodehydration by using an inorganic acid that has dehydrating function and an condensate thereof, (3) a method of azeotropic cyclodehydration in the presence of an acid catalyst, (4) a method of cyclodehydration by using a specific dehydration agent, and (5) a method of cyclodehydration by heating.

Among the imide compounds (D), those wherein each W and each Z are a group other than hydrogen may either be produced by using starting materials (A) and (B) each having corresponding substituent, or may be secondarily derived from imide compounds wherein each W and each Z are hydrogen.

The compounds (C) and (D) may either be isolated to be used for the reaction of producing the polyimide esters of the present invention, or may be not isolated but continuously reacted with compounds Ia, IIIa, and IVa.

The compounds IIIa which may be used as the raw material in the present invention include hydroquinone, 4,4′-dihydroxybiphenyl, or the products of acylation of hydroquinone or 4,4′-dihydroxybiphenyl with RCOO-COR. The preferred are hydroquinone, 4,4′-dihydroxybiphenyl, 1,4-diacetoxybenzene, and 4,4′-diacetoxybiphenyl.

The compounds IVa which may be used as the raw material in the present invention include terephthalic acid derivatives, isophthalic acid derivatives, and the products of esterification of terephthalic acid derivatives or isophthalic acid derivatives with ZOH, Z being as defined above. The preferred are terephthalic acid, isophthalate acid, dimethyl terephthalate, and dimethyl isophthalate.

Among the compounds Ia, IIIa, and IVa, those wherein W and Z are groups other than hydrogen may either be prepared individually or simultaneously.

The reaction of the compounds Ia, (C) or (D) (IIa, IIb, IIc, IId, IIe, IIf, IIg, or IIh), IIIa, and IVa is carried out generally at 200° to 400° C., preferably 230° to 370° C., generally under atmospheric pressure. In the latter half of polycondensation, the reaction is preferably carried out at 300 to 0.01 Torr. The reaction time varies generally from several minutes to tens hours depending on the desired melt viscosity of the polymer. In order to prevent the degradation of the polymer at the reaction temperature, it is preferable to restrict the reaction time from several minutes to several hours.

Though the reaction described above does not particularly require catalysts, proper copolymerization catalysts such as antimony oxide or germanium oxide may be used.

The all compounds may be initially mixed to be reacted, or may be individually added at various reaction stage. Thus, the composition distribution of the polyimide esters can be controlled optionally from random copolyesters to block copolyesters.

By carrying out the reaction as described above, the compounds represented by the general formula: W—O—Z are eliminated to conclude the reaction. Some illustrative examples of R in W and Z include methyl, ethyl, n-butyl, t-butyl, n-amyl, neo-pentyl, n-hexyl, iso-octyl, nonyl, decyl, phenyl, tolyl, naphthyl, allyl, cyclopentyl, and cyclohexyl.

The polyimide esters according to the present invention can be injection molded at general mold temperatures (400° C. or lower), and any molding method generally employed for thermoplastic resins, such as extrusion molding, compression molding or spinning. Also, the molds therefrom may be heat treated at a proper temperature and for a proper time.

The polyimide esters of the present invention are useful as materials for accurately injection molded parts, filament, film, sheet, and the like which require dimensional stability and dimensional accuracy.

The following examples are presented as specific illustrations of the claimed invention. It should be understood, however, that the invention is not limited to the specific details set forth in the examples.

EXAMPLE

PREPARATION EXAMPLE 1

Preparation of compound (a)

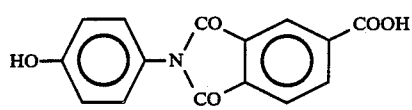

9.6 g (0.05 mol) of trimellitic anhydride and 5.5 g (0.05 mol) of p-aminophenol were dissolved in 100 ml of N-methylpyrrolidone. The resulting solution was refluxed for 4 hours and then cooled. Upon introducing the cooled solution in 500 ml of water, right yellow crystals separated out. The crystals were sequentially filtered, washed with water, and dried, to obtain the compound represented by the above formula.

PREPARATION EXAMPLE 2

Preparation of compound (b)

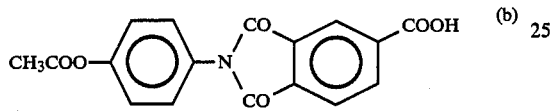

The compound (a) was dissolved in pyridine. After adding excess acetic anhydride, the solution was refluxed for 24 hours. The resulting reaction solution was introduced in water to obtain 4-carboxy-N-(4-acetoxyphenyl)phthalimide represented by the above formula.

4-carboxy-N-(3-acetoxyphenyl)phthalimide was prepared by repeating the above-described procedure with the proviso that m-aminophenol was used in place of p-aminophenol.

EXAMPLE 1

Into a 1.4 liter reaction vessel equipped with double-helical-blades were placed 1.2 mol (216.19 g) of p-acetoxybenzoic acid, 0.3 mol (97.58 g) of 4-carboxy-N-(4-acetoxyphenyl)phthalimide, 0.5 mol (135.14 g) of diacetoxybiphenyl, 0.25 mol (41.53 g) of terephthalic acid, and 0.25 mol (41.53 g) of isophthalic acid. After vacuum drying the mixture at 110° C. for 30 minutes, the reaction system was replaced with nitrogen. The content of the reaction vessel was then heated to 200° C. to form a homogeneous solution, and the temperature was maintained at 200° C. for 90 minutes. The temperature was then raised to 320° to 330° C., and polymerization was proceeded while maintaining the temperature for 30 minutes and distilling acetic acid away. Subsequently, the pressure of the reaction system was reduced to 1 to 100 Torr, and the reaction was further proceeded for 30 minutes under the reduced pressure. The amount of the acetic acid distilled out was 100% of the theoretical value, and the yield of the polymer obtained was 100%.

The result of the elementary analysis of the polymer obtained was as follows:

|  | C | H | N |
|---|---|---|---|
| Calculated value (%) | 72.0 | 3.4 | 1.1 |
| Actual value (%) | 71.6 | 3.3 | 1.0 |

The IR spectrum of the polymer obtained was shown in FIG. 1.

The results show that the polyimide ester having the structural units and constitution represented by the following formulas was obtained:

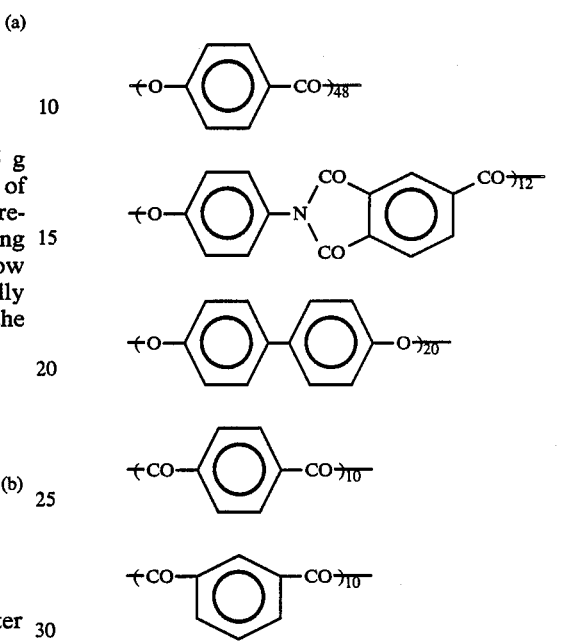

The melt viscosity of the polymer was measured using a Kōka type flow tester (Shimazu Flow Tester, CFT-500) and a dye of 1.0 mm in diameter and L/D=10, under a extrusion pressure of 10 kgf/cm$^2$, at a temperature raising rate of 5° C. /min. The polymer began to flow at 360° C. and had a melt viscosity of 219 Pa·s at 370° C. The apparent shear stress calculated from the measuring conditions described above was 0.025 MPa.

The polymer showed optical anisotropy in molten state. The measurement of the optical anisotropy was conducted by using a polarizing microscope produced by Nikon Co., Ltd. equipped with a hot stage produced by Lincam Co., Ltd.

EXAMPLE 2

Into a 1.4 liter reaction vessel equipped with double-helical-blades were placed 1.35 mol (243.21 g) of p-acetoxybenzoic acid, 0.15 mol (48.79 g) of 4-carboxy-N-(4-acetoxyphenyl)phthalimide, 0.5 mol (135.14 g) of diacetoxybiphenyl, 0.375 mol (62.30 g) of terephthalic acid, and 0.125 mol (20.77 g) of isophthalic acid. After vacuum drying the mixture at 110° C. for 30 minutes, the reaction system was replaced with nitrogen. The content of the reaction vessel was then heated to 200° C. to form a homogeneous solution, and the temperature was maintained at 200° C. for 90 minutes. The temperature was then raised to 320° to 330° C., and polymerization was proceeded while maintaining the temperature for 30 minutes and distilling acetic acid away. Subsequently, the pressure of the reaction system was reduced to 100 mmHg, and the reaction was further proceeded for 40 minutes under the reduced pressure. The amount of the acetic acid distilled out was 100% of the theoretical value, and the yield of the polymer obtained was 100%.

The result of the elementary analysis of the polymer obtained was as follows

|  | C | H | N |
|---|---|---|---|
| Calculated value (%) | 72.4 | 3.5 | 0.6 |
| Actual value (%) | 72.0 | 3.4 | 0.5 |

The results show that the polyimide ester having the structural units and constitution represented by the following formulas was obtained:

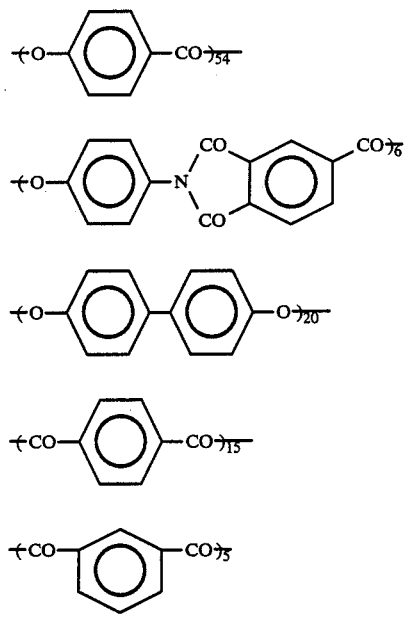

The melt viscosity of the polymer was measured by the same method as that employed in Example 1. The polymer had a melt viscosity of 175 Pa·s at 370° C.

The polymer showed optical anisotropy in molten state.

EXAMPLE 3

Into a 1.4 liter reaction vessel equipped with double-helical-blades were placed 1.25 mol (225.2 g) of p-acetoxybenzoic acid, 0.25 mol (81.32 g) of 4-carboxy-N-(4-acetoxyphenyl)phthalimide, 0.25 mol (67.57 g) of diacetoxybiphenyl, 0.25 mol (48.55 g) of diacetoxybenzene, 0.25 mol (41.53 g) of terephthalic acid, and 0.25 mol (41.53 g) of isophthalic acid. After vacuum drying the mixture at 110° C. for 30 minutes, the reaction system was replaced with nitrogen. The content of the reaction vessel was then heated to 200° C. to form a homogeneous solution. The temperature was then raised to 340° to 350° C., and polymerization was proceeded while maintaining the temperature for 30 minutes and distilling acetic acid away. Subsequently, the pressure of the reaction system was reduced to 1 to 100 Torr, and the reaction was further proceeded for 20 minutes under the reduced pressure. The amount of the acetic acid distilled out was 100% of the theoretical value, and the yield of the polymer obtained was 100%.

The result of the elementary analysis of the polymer obtained was as follows:

|  | C | H | N |
|---|---|---|---|
| Calculated value (%) | 70.9 | 3.3 | 1.0 |
| Actual value (%) | 70.5 | 3.2 | 0.9 |

The results show that the polyimide ester having the structural units and constitution represented by the following formulas was obtained:

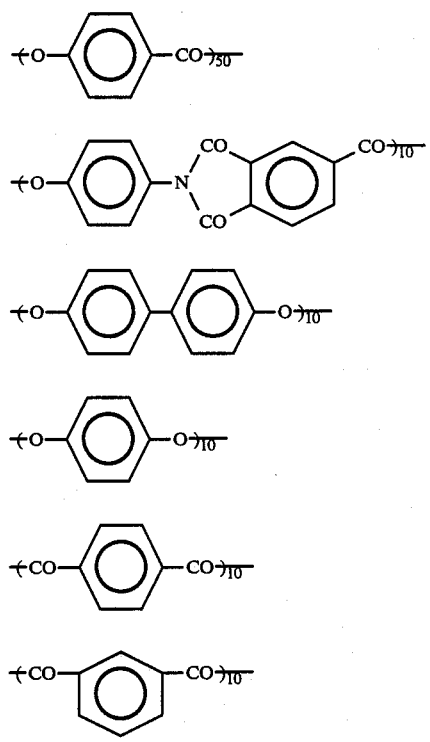

The melt viscosity of the polymer was measured by the same method as that employed in Example 1. The polymer had a melt viscosity of 263 Pa·s at 370° C.

The polymer showed optical anisotropy in molten state.

EXAMPLE 4

Into a 1.4 liter reaction vessel equipped with double-helical-blades were placed 0.81 mol (145.93 g) of p-acetoxybenzoic acid, 0.09 mol (29.28 g) of 4-carboxy-N-(3-acetoxyphenyl)phthalimide, 0.3 mol (81.08 g) of diacetoxybiphenyl, 0.225 mol (37.38 g) of terephthalic acid, and 0.075 mol (12.46 g) of isophthalic acid. After vacuum drying the content at 110° C. for 30 minutes, the reaction system was replaced with nitrogen. The content of the reaction vessel was then heated to 200° C. to form a homogeneous solution, and the temperature was maintained at 200° C. for 90 minutes. The temperature was then raised to 320° to 330° C., and polymerization was proceeded while maintaining the temperature for 30 minutes and distilling acetic acid away. Subsequently, the pressure of the reaction system was reduced to 1 to 100 Torr, and the reaction was further proceeded for 50 minutes under the reduced pressure. The amount of the acetic acid distilled out was 100% of the theoretical value, and the yield of the polymer obtained was 100%.

The result of the elementary analysis of the polymer obtained was as follows

|  | C | H | N |
|---|---|---|---|
| Calculated value (%) | 72.4 | 3.5 | 0.6 |
| Actual value (%) | 72.4 | 3.4 | 0.5 |

The results show that the polyimide ester having the structural units and constitution represented by the following formulas was obtained:

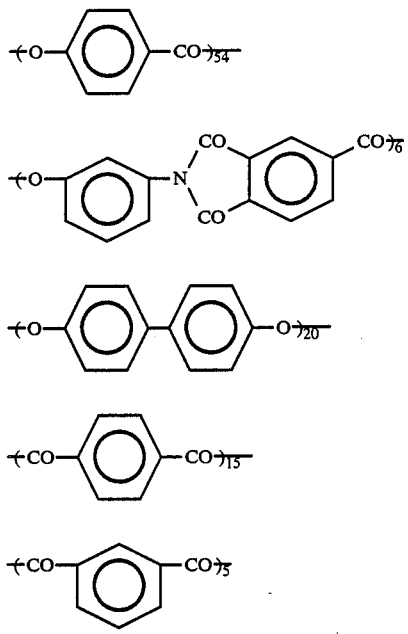

The melt viscosity of the polymer was measured by the same method as that employed in Example 1. The polymer had a melt viscosity of 156 Pa·s at 370° C.

The polymer exhibited optical anisotropy in molten state.

EXAMPLE 5

Into a 1.4 liter reaction vessel equipped with double-helical-blades were placed 1.92 mol (345.9 g) of p-acetoxybenzoic acid, 0.18 mol (58.55 g) of 4-carboxy-N-(4-acetoxyphenyl)phthalimide, 0.45 mol (121.63 g) of diacetoxybiphenyl, 0.15 mol (24.92 g) of diacetoxybiphenyl, 0.15 mol (24.92 g) of terephthalic acid, and 0.3 mol (49.84 g) of isophthalic acid. After vacuum drying the content at 110° C. for 30 minutes, the reaction system was replaced with nitrogen. The content of the reaction vessel was then heated to 200° C. to form a homogeneous solution. The temperature was then raised to 360° C., and polymerization was proceeded while maintaining the temperature for 30 minutes and distilling acetic acid away. Subsequently, the pressure of the reaction system was reduced to 100 mmHg, and the reaction was further proceeded for 30 minutes under the reduced pressure. The amount of the acetic acid distilled out was 100% of the theoretical value, and the yield of the polymer obtained was 100%.

The result of the elementary analysis of the polymer obtained was as follows

|  | C | H | N |
|---|---|---|---|
| Calculated value (%) | 71.8 | 3.4 | 0.6 |
| Actual value (%) | 71.3 | 3.3 | 0.5 |

The results show that the polyimide ester having the structural units and constitution represented by the following formulas was obtained:

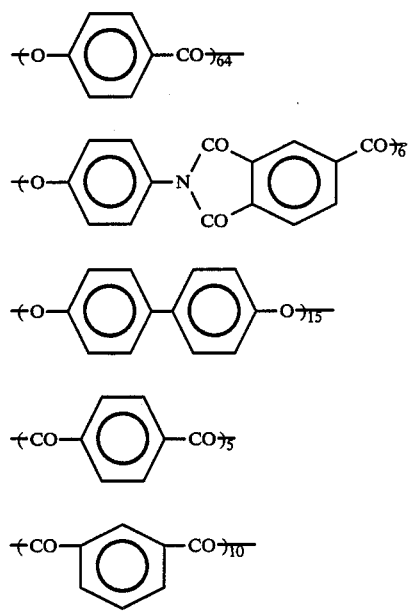

The melt viscosity of the polymer was measured by the same method as that employed in Example 1. The polymer had a melt viscosity of 213 Pa·s at 370° C.

The polymer exhibited optical anisotropy in molten state.

EXAMPLE 6

Into a 1.4 liter reaction vessel equipped with double-helical-blades were placed 1.99 mol (386.44 g) of p-propionoxybenzoic acid, 0.013 mol (4.41 g) of 4-carboxy-N-(4-propionoxyphenyl)phthalimide, 0.25 mol (74.58 g) of dipropionoxybiphenyl, and 0.25 mol (41.53 g) of isophthalic acid. After vacuum drying the mixture at 110° C. for 30 minutes, the reaction system was replaced with nitrogen. The content of the reaction vessel was then heated to 200° C. to form a homogeneous solution, and the temperature was maintained at 200° C. for 90 minutes. The temperature was then raised to 360° C., and polymerization was proceeded while maintaining the temperature for 30 minutes and distilling propionic acid away. Subsequently, the pressure of the reaction system was reduced to 100 mmHg, and the reaction was further proceeded for 20 minutes under the reduced pressure. The amount of the propionic acid distilled out was 100% of the theoretical value, and the yield of the polymer obtained was 100%.

The result of the elementary analysis of the polymer obtained was as follows

|  | C | H | N |
|---|---|---|---|
| Calculated value (%) | 71.4 | 3.5 | 0.05 |

| | C | H | N |
|---|---|---|---|
| Actual value (%) | 71.2 | 3.4 | 0.04 |

The results show that the polyimide ester having the structural units and constitution represented by the following formulas was obtained:

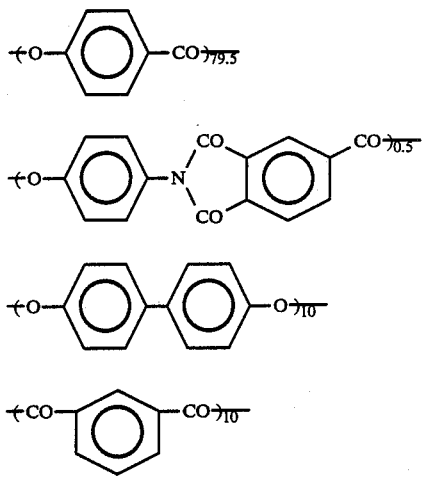

The melt viscosity of the polymer was measured by the same method as that employed in Example 1. The polymer had a melt viscosity of 269 Pa·s at 370° C.

The polymer exhibited anisotropy in molten state.

PREPARATION EXAMPLE 3

Preparation of compound (c)

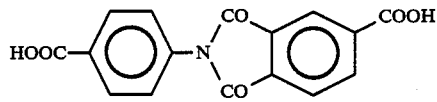

34.56 g (0.18 mol) of trimellitic anhydride and 24.66 g (0.18 mol) of p-aminobenzoic acid were dissolved in 90 ml of dimethylformamide (DMF). After refluxing DMF for 2.5 hours, the solution was cooled. Upon introducing the reaction product in 360 ml of water, yellow, powdery crystals separated out. The crystals were sequentially filtered, washed with diluted acetic acid and then with water, and dried, and the objective compound (c) was obtained.

Elementary analysis: Theoretical value (Actual value): C 61.73 (60.20), H 2.89 (2.96), N 4.50 (5.01)

PREPARATION EXAMPLE 4

Preparation of compound (d)

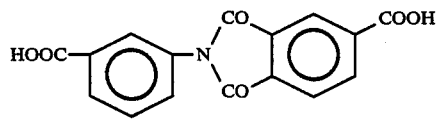

The procedure employed in the preparation of the compound (c) was repeated with the proviso that m-aminobenzoic acid was used in place of p-aminobenzoic acid.

PREPARATION EXAMPLE 5

Preparation of compounds (e) and (f)

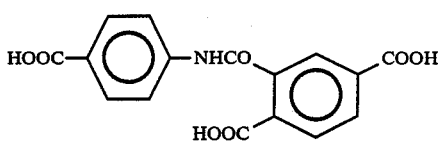

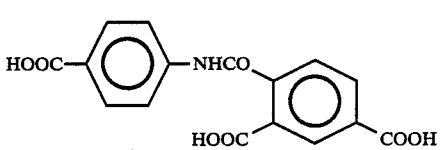

Into a 1.4 liter reaction vessel equipped with double-helical-blades were placed 0.15 mol (20.57 g) of p-aminobenzoic acid, 0.15 mol (28.82 g) of trimellitic anhydride, and 100 ml of methyl ethyl ketone. The content was stirred for 3 hours at room temperature to form 0.15 mol (49.39 g) of white precipitate, the mixture of (e) and (f).

EXAMPLE 7

Into a 1.4 liter reaction vessel equipped with double-helical-blades were placed 1.5 mol (207.18 g) of p-hydroxybenzoic acid, 0.5 mol (93.11 g) of 4,4'-dihydroxybiphenyl, 0.3 mol (49.84 g) of terephthalic acid, 0.125 mol (20.77 g) of isophthalic acid, 0.075 mol (23.34 g) of 4-carboxy-N-(4-carboxyphenyl)phthalimide (c), and 2.5 mol (255.23 g) of acetic anhydride. The content was heated to 150° C. in a stream of nitrogen with stirring, and the temperature was then maintained for 120 minutes. Subsequently, the temperature was raised to 350° C. in 90 minutes, and polymerization was then proceeded for 30 minutes while distilling acetic acid away and maintaining the temperature at 350° C. The pressure of the reaction system was then reduced to 100 Torr, and the polymerization was proceeded for 30 minutes under the reduced pressure and further for 7 minutes under a further reduced pressure of 2 Torr. The thus obtained polymer was collected in molten state.

The result of the elementary analysis of the polymer obtained was as follows

| | C | H | N |
|---|---|---|---|
| Calculated value (%) | 72.6 | 3.5 | 0.3 |
| Actual value (%) | 72.3 | 3.5 | 0.2 |

Figure 2:
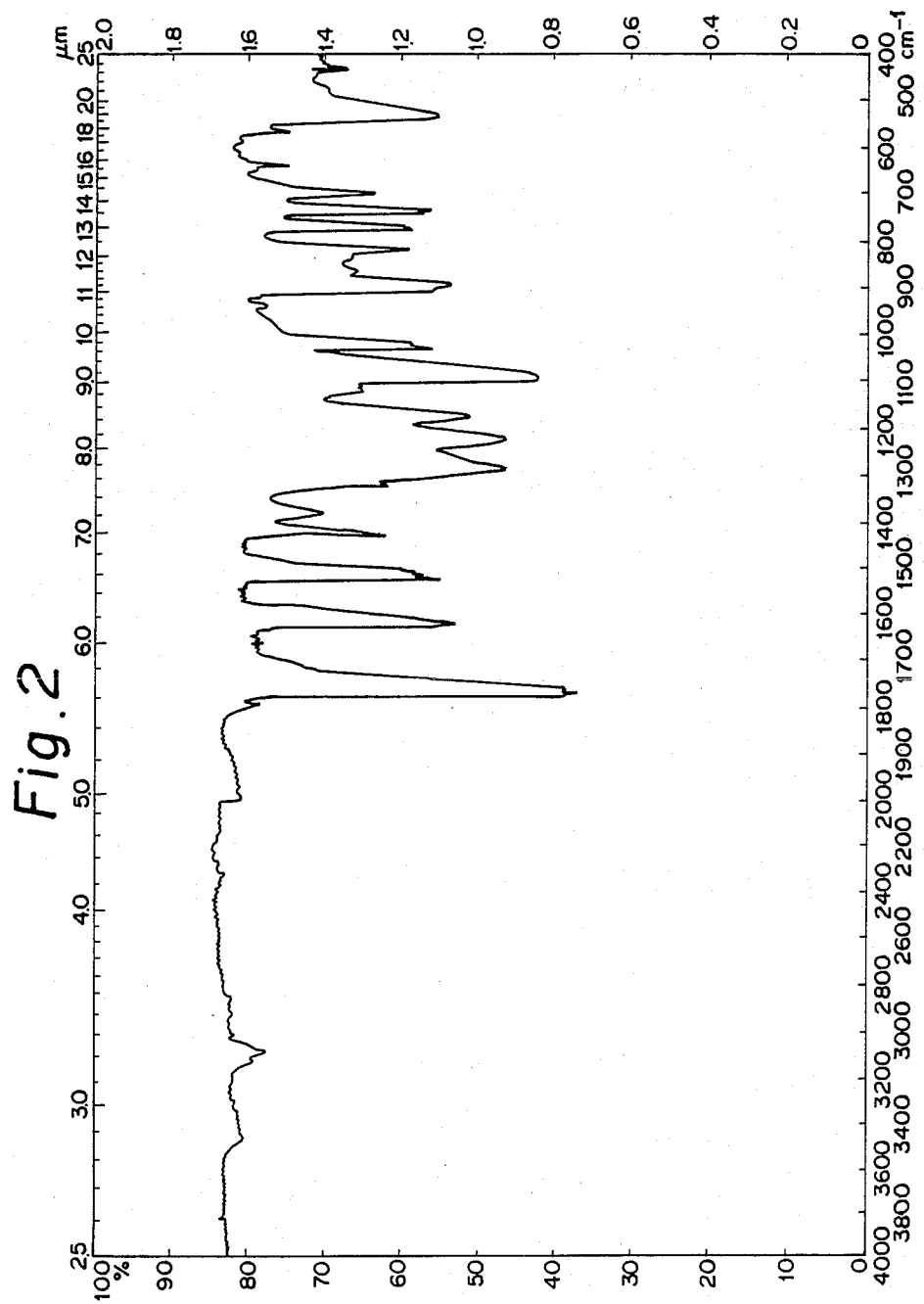
FIG. 2 is IR spectrum of the wholly aromatic polyimide ester obtained in Example 7.

FIG. 2 shows IR spectrum of the polymer obtained.

The results show that the polyimide ester having the structural units and constitution represented by the following formulas was obtained:

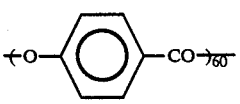

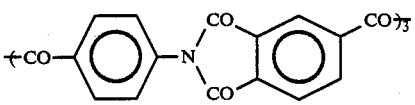

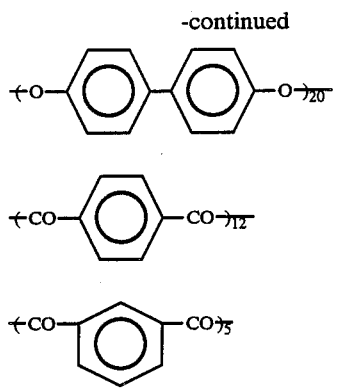

The melt viscosity of the polymer was measured by the same method as that employed in Example 1. The polymer had a melt viscosity of 130 Pa·s at 370° C.

The polymer exhibited anisotropy in molten state.

EXAMPLE 8

Into a 1.4 liter reaction vessel equipped with double-helical-blades were placed 1.25 mol (172.65 g) of p-hydroxybenzoic acid, 0.625 mol (116.38 g) of 4,4'-dihydroxybiphenyl, 0.125 mol (20.77 g) of terephthalic acid, 0.25 mol (41.53 g) of isophthalic acid, 0.25 mol (77.81 g) of 4-carboxy-N-(4-carboxyphenyl)phthalimide (c), and 2.5 mol (255.23 g) of acetic anhydride. The content was heated to 150° C. in a stream of nitrogen with stirring, and the temperature was then maintained for 120 minutes. Subsequently, the temperature was raised to 350° C. in 90 minutes, and polymerization was then proceeded for 30 minutes while distilling acetic acid away and maintaining the temperature at 350° C. The pressure of the reaction system was then reduced to 100 Torr, and the polymerization was proceeded for 30 minutes under the reduced pressure and further for 2 minutes under a more reduced pressure of 2 Torr. The thus obtained polymer was collected in molten state.

The result of the elementary analysis of the polymer obtained was as follows:

|  | C | H | N |
|---|---|---|---|
| Calculated value (%) | 72.7 | 3.5 | 0.9 |
| Actual value (%) | 72.3 | 3.4 | 0.8 |

The results show that the polyimide ester having the structural units and constitution represented by the following formulas was obtained:

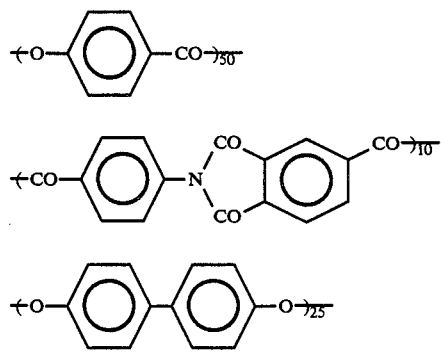

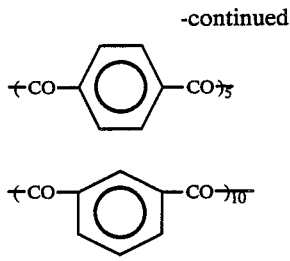

The melt viscosity of the polymer was measured by the same method as that employed in Example 1. The polymer had a melt viscosity of 20 Pa·s at 370° C.

The polymer exhibited anisotropy in molten state.

EXAMPLE 9

Into a 1.4 liter reaction vessel equipped with double-helical-blades were placed 1.5 mol (207.18 g) of p-hydroxybenzoic acid, 0.25 mol (46.55 g) of 4,4'-dihydroxybiphenyl, 0.25 mol (27.53 g) of hydroquinone, 0.225 mol (37.38 g) of terephthalic acid, 0.125 mol (20.77 g) of isophthalic acid, 0.15 mol (46.69 g) of 4-carboxy-N-(4-carboxyphenyl)phthalimide (c), and 2.5 mol (255.23 g) of acetic anhydride. The content was heated to 150° C. in a stream of nitrogen with stirring, and the temperature was then maintained for 120 minutes. Subsequently, the temperature was raised to 350° C. in 90 minutes, and polymerization was then proceeded for 30 minutes while distilling acetic acid away and maintaining the temperature at 350° C. The pressure of the reaction system was then reduced to 100 Torr, and the polymerization was proceeded for 30 minutes under the reduced pressure and further for 5 minutes under a more reduced pressure of 2 Torr. The thus obtained polymer was collected in molten state.

The result of the elementary analysis of the polymer obtained was as follows:

|  | C | H | N |
|---|---|---|---|
| Calculated value (%) | 71.1 | 3.4 | 0.6 |
| Actual value (%) | 71.0 | 3.3 | 0.5 |

The results show that the polyimide ester having the structural units and constitution represented by the following formulas was obtained:

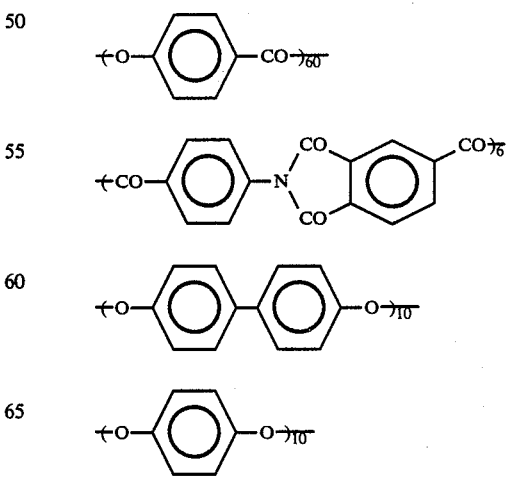

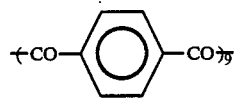

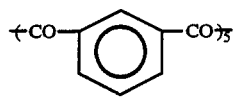

The melt viscosity of the polymer was measured by the same method as that employed in Example 1. The polymer had a melt viscosity of 80 Pa·s at 370° C.

The polymer exhibited anisotropy in molten state.

EXAMPLE 10

Into a 1.4 liter reaction vessel equipped with double-helical-blades were placed 1.75 mol (241.71 g) of p-hydroxybenzoic acid, 0.375 mol (69.83 g) of 4,4'-dihydroxybiphenyl, 0.225 mol (37.38 g) of terephthalic acid, 0.125 mol (20.77 g) of isophthalic acid, 0.025 mol (8.23 g) of the mixture of amic acid compounds (e) and (f), and 2.5 mol (255.23 g) of acetic anhydride. The content was heated to 150° C. in a stream of nitrogen with stirring, and the temperature was then maintained for 120 minutes. Subsequently, the temperature was raised to 350° C. in 90 minutes, and polymerization was then proceeded for 30 minutes while distilling acetic acid away and maintaining the temperature at 350° C. The pressure of the reaction system was then reduced to 100 Torr, and the polymerization was proceeded for 30 minutes under the reduced pressure and further for 10 minutes under a more reduced pressure of 2 Torr. The thus obtained polymer was collected in molten state.

The result of the elementary analysis of the polymer obtained was as follows:

|  | C | H | N |
|---|---|---|---|
| Calculated value (%) | 72.1 | 3.5 | 0.1 |
| Actual value (%) | 72.1 | 3.4 | 0.1 |

The results show that the polyimide ester having the structural units and constitution represented by the following formulas was obtained:

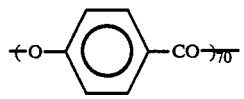

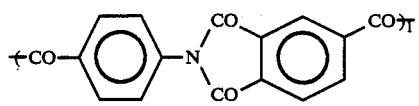

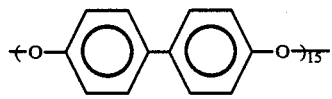

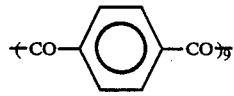

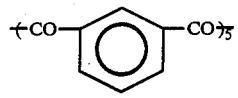

The melt viscosity of the polymer was measured by the same method as that employed in Examaple 1. The polymer had a melt viscosity of 230 Pa·s at 370° C.

The polymer exhibited anisotropy in molten state.

EXAMPLE 11

Into a 1.4 liter reaction vessel equipped with double-helical-blades were placed 1.5 mol (207.18 g) of p-hydroxybenzoic acid, 0.5 mol (93.11 g) of 4,4'-dihydroxybiphenyl, 0.225 mol (37.38 g) of terephthalic acid, 0.125 mol (20.77 g) of isophthalic acid, 0.15 mol (46.69 g) of 4-carboxy-N-(3-carboxyphenyl)phthalimide (d), and 2.5 mol (255.23 g) of acetic anhydride. The content was heated to 150° C. in a stream of nitrogen with stirring, and the temperature was then maintained for 120 minutes. Subsequently, the temperature was raised to 350° C. in 90 minutes, and polymerization was then proceeded for 30 minutes while distilling acetic acid away and maintaining the temperature at 350° C. The pressure of the reaction system was then reduced to 100 Torr, and the polymerization was proceeded for 30 minutes under the reduced pressure and further for 30 minutes under a more reduced pressure of 2 Torr. The thus obtained polymer was collected in molten state.

The result of the elementary analysis of the polymer obtained was as follows:

|  | C | H | N |
|---|---|---|---|
| Calculated value (%) | 72.4 | 3.5 | 0.6 |
| Actual value (%) | 72.0 | 3.4 | 0.5 |

The results show that the polyimide ester having the structural units and constitution represented by the following formulas was obtained:

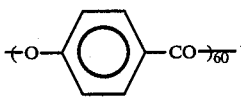

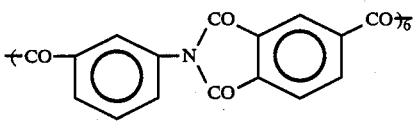

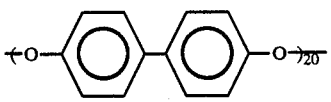

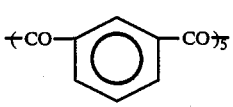

The melt viscosity of the polymer was measured by the same method as that employed in Example 1. The polymer had a melt viscosity of 150 Pa·s at 370° C.

The polymer exhibited anisotropy in molten state.

EXAMPLE 12

Into a 1.4 liter reaction vessel equipped with double-helical-blades were placed 0.15 mol (20.57 g) of p-aminobenzoic acid, 0.15 mol (28.82 g) of trimellitic anhydride, and 100 ml of methyl ethyl ketone. The content was then stirred for 3 hours at room temperature to form 0.15 mol (49.39 g) of white precipitate of a mixture of amic acid compounds (e) and (f).

Subsequently, to the reaction vessel were added 1.5 mol (207.18 g) of p-hydroxybenzoic acid, 0.5 mol (93.11 g) of 4,4'-dihydroxybiphenyl, 0.225 mol (37.38 g) of terephthalic acid, 0.125 mol (20.77 g) of isophthalic acid, and 2.5 mol (255.23 g) of acetic anhydride. The content was heated to 150° C. in a stream of nitrogen with stirring, and the temperature was then maintained for 120 minutes. The temperature was then raised to 350° C. in 90 minutes, and polymerization was proceeded for 30 minutes while distilling methyl ethyl ketone, water, and acetic acid away and maintaining the temperature at 350° C. The pressure of the reaction system was then reduced to 100 Torr, and the polymerization was proceeded for 30 minutes under the reduced pressure and further for 10 minutes under a more reduced pressure of 2 Torr. The thus obtained polymer was collected in molten state.

The result of the elementary analysis of the polymer obtained was as follows:

|  | C | H | N |
|---|---|---|---|
| Calculated value (%) | 72.4 | 3.5 | 0.6 |
| Actual value (%) | 72.3 | 3.4 | 0.5 |

The results show that the polyimide ester having the structural units and constitution represented by the following formulas was obtained:

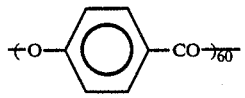

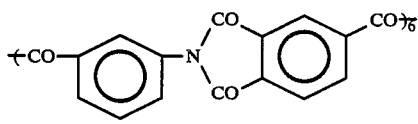

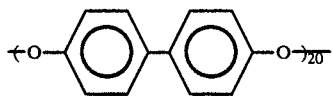

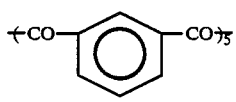

The melt viscosity of the polymer was measured by the same method as that employed in Example 1. The polymer had a melt viscosity of 50 Pa·s at 370° C.

The polymer exhibited anisotropy in molten state.

COMPARATIVE EXAMPLE 1

Into a 1.4 liter reaction vessel equipped with double-helical-blades were placed 1.5 mol (207.18 g) of p-hydroxybenzoic acid, 0.5 mol (93.11 g) of 4,4'-dihydroxybiphenyl, 0.375 mol (62.30 g) of terephthalic acid, 0.125 mol (20.77 g) of isophthalic acid, and 2.7 mol (275.64 g) of acetic anhydride. The content was heated to 150° C. in a stream of nitrogen with stirring, and the temperature was then maintained for 120 minutes. Subsequently, the temperature was raised to 350° C. in 90 minutes, and polymerization was then proceeded for 30 minutes while distilling acetic acid away and maintaining the temperature at 350° C. The pressure of the reaction system was then reduced to 100 Torr, and the polymerization was proceeded for 5 minutes under the reduced pressure. The thus obtained polymer was collected in molten state.

The polymer has the structural units and constitution represented by the following formulas:

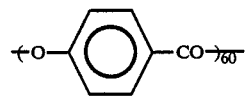

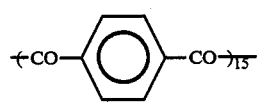

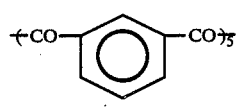

The polymer exhibited anisotropy in molten state.

EXAMPLE 13

Into a 1.4 liter autoclave equipped with double-helical-blades were placed 0.025 mol (4.10 g) of hydroxyphthalic anhydride, 0.025 mol (2.73 g) of p-aminophenol, and 100 ml of methyl ethyl ketone. The content was stirred for 1 hour at room temperature to form precipitate of an amic acid compound IIf (W: H).

Subsequently, into the autoclave were added 1.5 mol (207.18 g) of p-hydroxybenzoic acid, 0.475 mol (79.14 g) of dihydroxybiphenyl, 0.375 mol (62.30 g) of terephthalic acid, 0.125 mol (20.77 g) of isophthalic acid, and 2.5 mol (255.23 g) of acetic anhydride. The content was then heated to 150° C. in a stream of nitrogen with stirring, to distill methyl ethyl ketone away. After one hour of reflux of acetic anhydride, the temperature was raised to 350° C. in 90 minutes to distill water and acetic acid away, and cyclodehydration and polymerization of the amic acid was proceeded. The pressure of the reaction system was then reduced to 100 Torr, and the polymerization was proceeded for 30 minutes under the reduced pressure and then under a more reduced pressure of 2 Torr for 20 minutes. The thus obtained polymer was collected in molten state.

The result of the elementary analysis of the polymer obtained was as follows:

|  | C | H | N |
| --- | --- | --- | --- |
| Calculated value (%) | 72.6 | 3.5 | 0.1 |
| Actual value (%) | 72.5 | 3.2 | 0.1 |

The results show that the polyimide ester having the structural units and constitution represented by the following formulas was obtained:

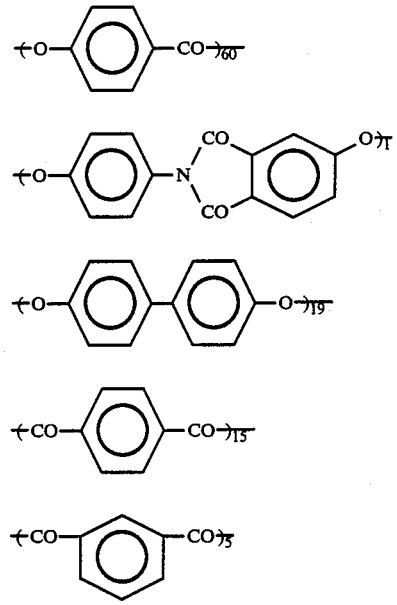

The melt viscosity of the polymer was measured by the same method as that employed in Example 1. The polymer had a melt viscosity of 54 Pa·s at 370° C.

The polymer exhibited anisotropy in molten state.

EXAMPLE 14

Into a 1.4 liter autoclave equipped with double-helical-blades were placed 0.075 mol (12.31 g) of hydroxyphthalic anhydride, 0.075 mol (8.18 g) of p-aminophenol, and 100 ml of methyl ethyl ketone. The content was stirred for 1 hour at room temperature to form precipitate of an amic acid compound IIf (W: H).

Subsequently, into the autoclave were added 1.5 mol (207.18 g) of p-hydroxybenzoic acid, 0.475 mol (79.14 g) of dihydroxybiphenyl, 0.375 mol (62.30 g) of terephthalic acid, 0.125 mol (20.77 g) of isophthalic acid, and 2.5 mol (255.23 g) of acetic anhydride. The content was then heated to 150° C. in a stream of nitrogen with stirring, to distill methyl ethyl ketone away. After one hour of reflux of acetic anhydride, the temperature was raised to 350° C. in 90 minutes to distill water and acetic acid away, and cyclodehydration and polymerization of the amic acid was proceeded. The pressure of the reaction system was then reduced to 100 Torr, and the polymerization was proceeded for 30 minutes under the reduced pressure and then for 13 minutes under a more reduced pressure of 2 Torr. The thus obtained polymer was collected in molten state.

The result of the elementary analysis of the polymer obtained was as follows:

|  | C | H | N |
| --- | --- | --- | --- |
| Calculated value (%) | 72.2 | 3.5 | 0.3 |
| Actual value (%) | 72.0 | 3.4 | 0.3 |

The results show that the polyimide ester having the structural units and constitution represented by the following formulas was obtained:

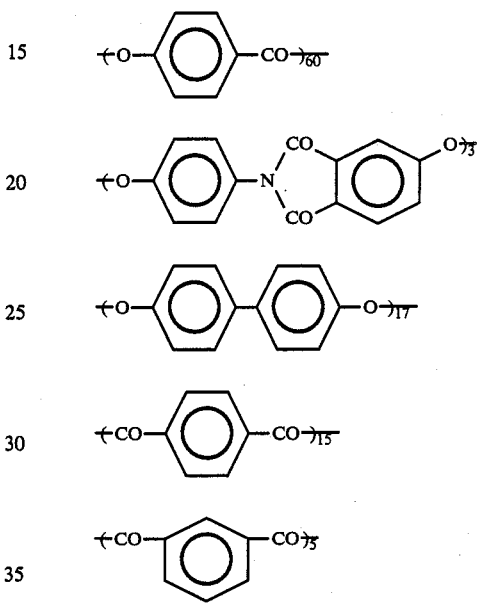

The melt viscosity of the polymer was measured by the same method as that employed in Example 1. The polymer had a melt viscosity of 191 Pa·s at 370° C. and exhibited anisotropy in molten state.

Figure 3:
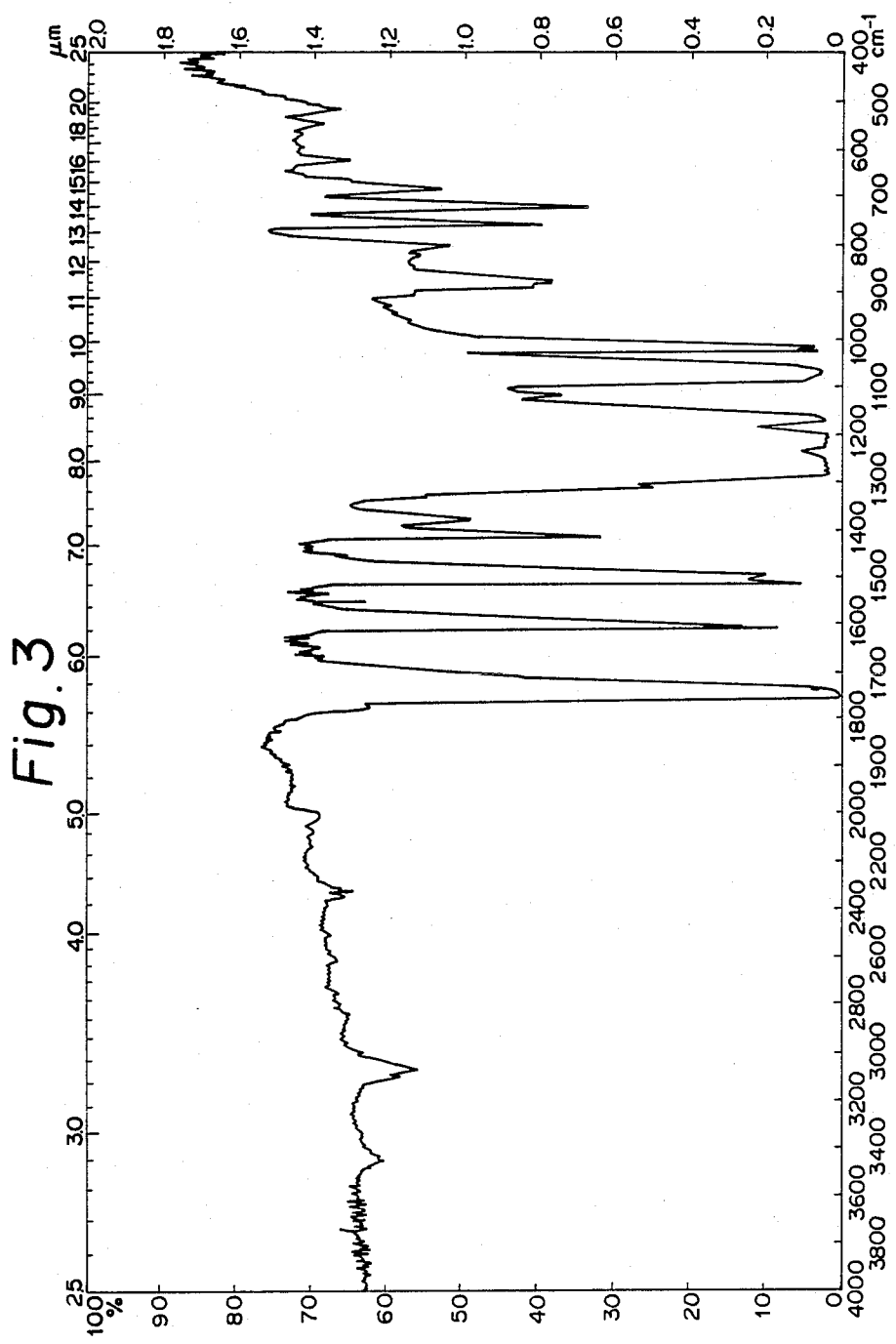
FIG. 3 is IR spectrum of the wholly aromatic polyimide ester obtained in Example 14.

FIG. 3 shows IR spectrum of the polymer obtained.

EXAMPLE 15

Into a 1.4 liter autoclave equipped with double-helical-blades were placed 0.025 mol (4.10 g) of hydroxyphthalic anhydride, 0.025 mol (3.43 g) of p-aminobenzoic acid, and 100 ml of methyl ethyl ketone. The content was stirred for 1 hour at room temperature to form precipitate of an amic acid compound IIh (W and Z: H).

Subsequently, into the autoclave were added 1.475 mol (203.73 g) of p-hydroxybenzoic acid, 0.5 mol (93.11 g) of dihydroxybiphenyl, 0.375 mol (62.30 g) of terephthalic acid, 0.125 mol (20.77 g) of isophthalic acid, and 255.23 g (2.5 mol) of acetic anhydride. The content was then heated to 150° C. in a stream of nitrogen with stirring, to distill methyl ethyl ketone away. After one hour of reflux of acetic anhydride, the temperature was raised to 350° C. in 90 minutes to distill water and acetic acid away, and cyclodehydration and polymerization of the amic acid was proceeded. The pressure of the reaction system was then reduced to 100 Torr, and the polymerization was proceeded for 30 minutes under the reduced pressure and then for 18 minutes under a more reduced pressure of 2 Torr. The thus obtained polymer was collected in molten state.

The result of the elementary analysis of the polymer obtained was as follows:

|  | C | H | N |
|---|---|---|---|
| Calculated value (%) | 72.7 | 3.6 | 0.1 |
| Actual value (%) | 72.5 | 3.5 | 0.1 |

The results show that the polyimide ester having the structural units and constitution represented by the following formulas was obtained:

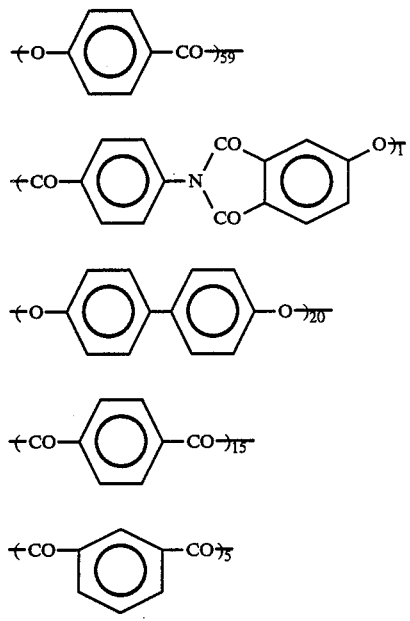

The melt viscosity of the polymer was measured by the same method as that employed in Example 1. The polymer had a melt viscosity of 381 Pa·s at 370° C. and exhibited anisotropy in molten state.

EXAMPLE 16

Into a 1.4 liter autoclave equipped with double-helical-blades were placed 0.075 mol (12.31 g) of hydroxyphthalic anhydride, 0.075 mol (10.29 g) of p-aminobenzoic acid, and 100 ml of methyl ethyl ketone. The content was stirred for 1 hour at room temperature to form precipitate of an amic acid compound IIh (W and Z: H).

Subsequently, into the autoclave were added 1.42 mol (196.82 g) of p-hydroxybenzoic acid, 0.5 mol (93.11 g) of dihydroxybiphenyl, 0.375 mol (62.30 g) of terephthalic acid, 0.125 mol (20.77 g) of isophthalic acid, and 2.5 mol (255.23 g) of acetic anhydride. The content was then heated to 150° C. in a stream of nitrogen with stirring, to distill methyl ethyl ketone away. After one hour of reflux of acetic anhydride, the temperature was raised to 350° C. in 90 minutes to distill water and acetic acid away, and cyclodehydration and polymerization of the amic acid was proceeded. The pressure of the reaction system was then reduced to 100 Torr, and the polymerization was proceeded for 30 minutes under the reduced pressure and then for 14 minutes under a more reduced pressure of 2 Torr. The thus obtained polymer was collected in molten state.

The result of the elementary analysis of the polymer obtained was as follows:

|  | C | H | N |
|---|---|---|---|
| Calculated value (%) | 72.6 | 3.5 | 0.3 |
| Actual value (%) | 72.4 | 3.5 | 0.3 |

The results show that the polyimide ester having the structural units and constitution represented by the following formulas was obtained:

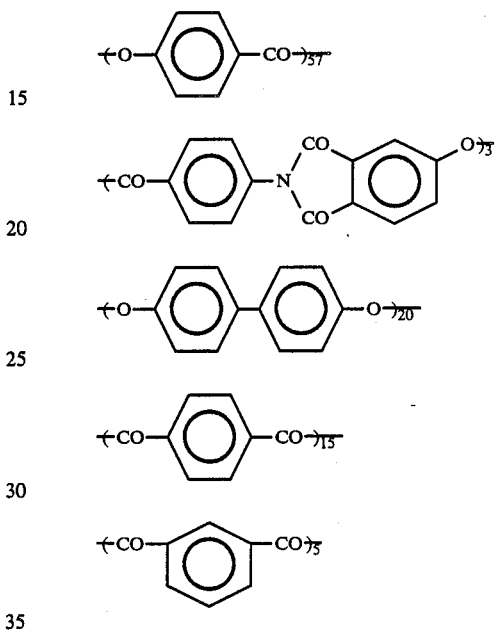

The melt viscosity of the polymer was measured by the same method as that employed in Example 1. The polymer had a melt viscosity of 201 Pa·s at 370° C. and exhibited anisotropy in molten state.

Figure 4:
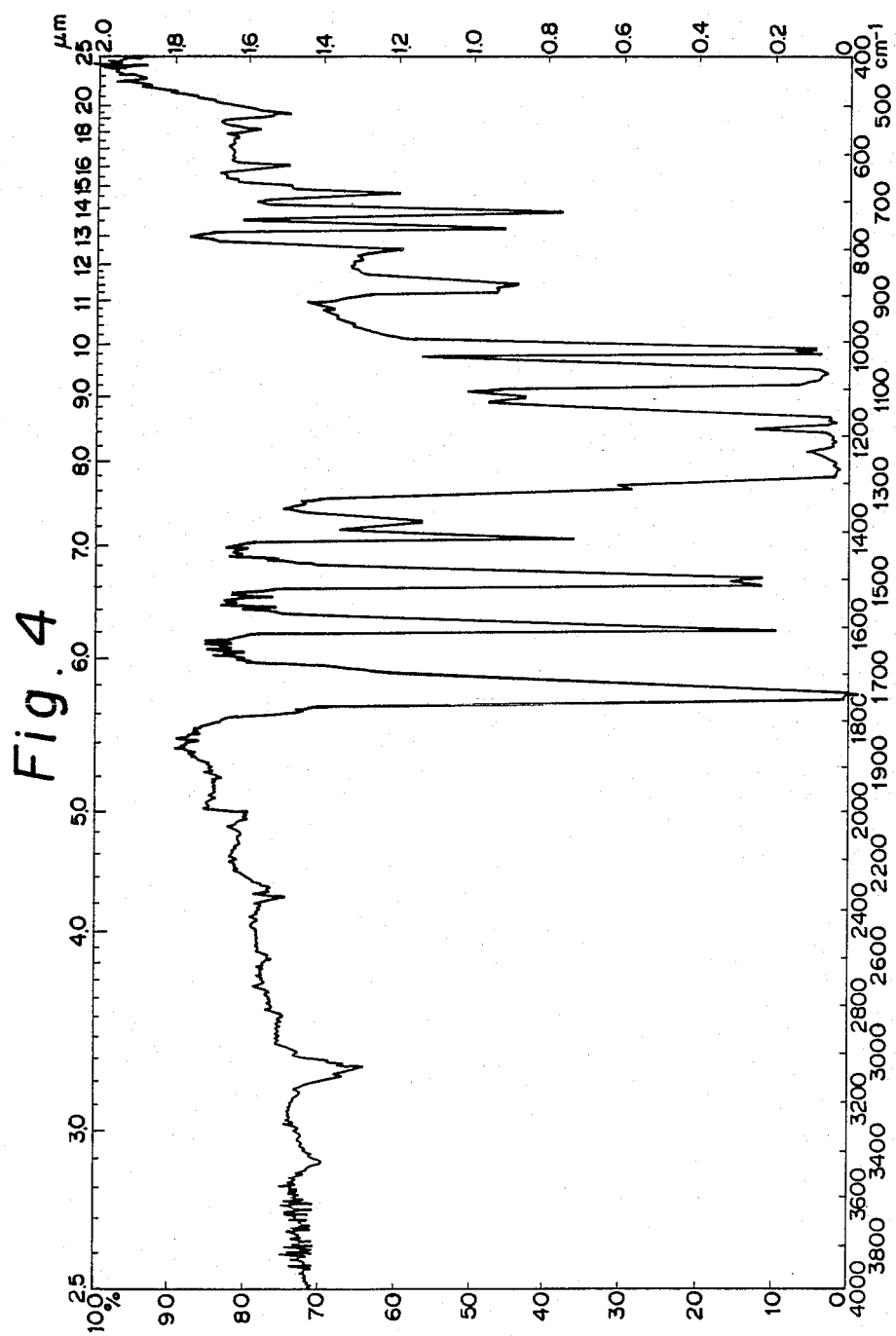
FIG. 4 is IR spectrum of the wholly aromatic polyimide ester obtained in Example 16.

FIG. 4 shows IR spectrum of the polymer obtained.

COMPARATIVE EXAMPLE 2

A commercial polybutyleneterephthalate (Duranex 2000 produced by Celanese Co., Ltd.) was used.

COMPARATIVE EXAMPLE 3

A commercial polycarbonate (A 2200 produced by Idemitsu Petrochemical Co., Ltd.) was used.

COMPARATIVE EXAMPLE 4

A commercial polyeter imide (Ultem 1000 produced by General Electric Company) was used.

COMPARATIVE EXAMPLE 5

A commercial thermotropic liquid-crystalline copolyester (Ekonol E6000 produced by SUMITOMO CHEMICAL CO., LTD.) was used.

COMPARATIVE EXAMPLE 6

A commercial thermotropic liquid-crystalline copolyester (EPE-220 produced by Mitsubishi Chemical Industries Ltd.) was used.

COMPARATIVE EXAMPLE 7

A commercial thermotropic liquid-crystalline copolyester (Vectra A950 produced by Celanese Co., Ltd.) was used.

Coefficients of linear expansion, coefficients of mold shrinkage, flexural properties, and heat distortion temperatures of the polymers of examples 1 to 17 and comparative examples 1 to 7 are shown in Table.

Measurements of these properties were conducted as follows.

The other test conditions were accordant to ASTM-D-648.

TABLE

| Polymer | Coefficient of linear expansion ($\times 10^{-5}$ °C.$^{-1}$) | | Coefficient of mold shrinkage (%) | | Flexural properties | | Heat distortion temperature °C. |
|---|---|---|---|---|---|---|---|
| | MD | TD | MD | TD | Flexural strength (MPa) | Flexural modulus (GPa) | |
| Example 1 | −0.1 | 0.2 | −0.1 | 0.0 | 140 | 16 | 238 |
| Example 2 | −0.2 | 0.6 | −0.1 | 0.0 | 170 | 16 | 264 |
| Example 3 | −0.1 | 0.4 | −0.2 | 0.0 | 160 | 17 | 261 |
| Example 4 | −0.2 | 0.6 | −0.1 | 0.0 | 140 | 13 | 208 |
| Example 5 | −0.1 | 0.5 | −0.2 | 0.0 | 150 | 17 | 258 |
| Example 6 | −0.2 | 0.9 | −0.4 | 0.1 | 140 | 15 | 270 |
| Example 7 | −0.3 | −0.2 | −0.1 | 0.1 | 160 | 16 | 264 |
| Example 8 | 0.2 | −0.3 | 0.2 | 0.0 | 170 | 18 | 205 |
| Example 9 | −0.1 | −0.2 | 0.1 | 0.0 | 160 | 17 | 231 |
| Example 10 | −0.1 | 0.3 | −0.1 | 0.3 | 180 | 17 | 227 |
| Example 11 | 0.2 | 0.5 | 0.0 | 0.4 | 130 | 11 | 177 |
| Example 12 | −0.1 | −0.2 | 0.1 | 0.0 | 160 | 19 | 251 |
| Example 13 | −0.1 | 0.3 | −0.1 | 0.3 | 140 | 15 | 264 |
| Example 14 | −0.1 | 0.1 | −0.1 | 0.1 | 160 | 16 | 250 |
| Example 15 | −0.1 | 0.4 | −0.1 | 0.2 | 160 | 17 | 273 |
| Example 16 | −0.1 | 0.2 | −0.1 | 0.1 | 170 | 18 | 269 |
| Comparative Ex. 1 | −0.4 | 5.2 | −0.1 | 1.5 | 100 | 7 | 254 |
| Comparative Ex. 2 | 10.0 | 11.0 | 1.8~2.0 | | 87 | 2.6 | 80 |
| Comparative Ex. 3 | 6.3 | 6.1 | 0.5~0.7 | | 92 | 2.3 | 134 |
| Comparative Ex. 4 | 5.6 | 5.7 | 0.5~0.7 | | 107 | 3.4 | 200 |
| Comparative Ex. 5 | 1.0 | 11.0 | 0.15 | 1.29 | 96 | 6.5 | 250 |
| Comparative Ex. 6 | −1.0 | 3.0 | −0.3 | 0.3 | 155 | 12.5 | 120 |
| Comparative Ex. 7 | −1.1 | 4.1 | −0.1 | 1.2 | 155 | 9.0 | 180 |

Molding of test pieces

The molding was conducted by using an injection molder (Toshiba IS 45 P) at a molding temperature of 250° to 350° C. and a mold temperature of 120° C.

Measuring methods

1. Coefficient of linear expansion

The measurement of coefficient of linear expansion was conducted in compression mode by using Seiko Thermal Analysis Apparatuses SSC-300 and TMA-100 on a test piece of about 10 (measuring direction)×5×1.6 mm which was cut out from the center portion of a plate of 63.5×63.5×1.6 mm, under a load of 5 g, at a temperature raising speed of 10° C./min.

2. Coefficient of mold shrinkage

The coefficients of mold shrinkage of the plate described above in MD and TD were calculated from the following formula.

Coefficient of mold shrinkage = [{(Inner size of mold cavity − (Measured length of test piece)}/(Inner size of mold cavity)] × 100 (%)

3. Flexural properties

The measurement of flexural properties was conducted on a test piece of 127×12.7×3.2 mm at 23° C. using HTM 250 produced by Toyo Seiki Co., Ltd.

The other test conditions were accordant to ASTM-D-790.

4. Heat distortion temperature

The measurement of heat distortion temperature was conducted on a test piece of 127×12.7×3.2 mm under a load of 18.6 kg/cm² using an apparatus produced by Toyo Seiki Co., Ltd.

The polyimide esters of the present invention have small coefficients of linear expansion and small coefficients of mold shrinkage, and it indicates their excellence in dimensional stability and dimensional accuracy. Their excellence in dimensional stability and dimensional accuracy is further indicated by their anisotropy between in MD and TD that is smaller than that of the conventional liquid-crystalline polymer (Comparative Example 4). It is also apparent that the polyimide esters of the present invention largely excel in strength and elastic modulus. Particularly, in a case where the polyimide esters of the present invention is laminated to inorganic materials such as metal materials, glass or ceramics or is used for insert molding by injection molding, these excellent properties make it possible to avoid the problems that could not be solved by conventional liquid-crystalline polymers, such as peeling, bending, torsion, increases in internal distortion and internal stress, which is caused by the changes of dimensions brought by the changes of temperature. Further, the both of the coefficients of linear expansion of the polyimide esters of the present invention in MD and TD are close to zero, indicating small anisotropy. The small anisotropy in coefficient of linear expansion indicates the small anisotropy in changes of dimensions caused by changes of temperature. Therefore, in a case where they are used alone, they also have extremely excellent characteristic that troubles such as warping or deformation hardly occur.

In addition, the polyimide esters of the present invention are as well excellent in strength and heat resistance.

What is claimed is:

1. A thermoplastic wholly aromatic polyimide ester consisting essentially of structural units represented by the general formulas I, II, III, and IV:

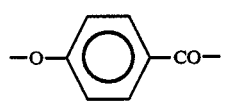

I

-continued

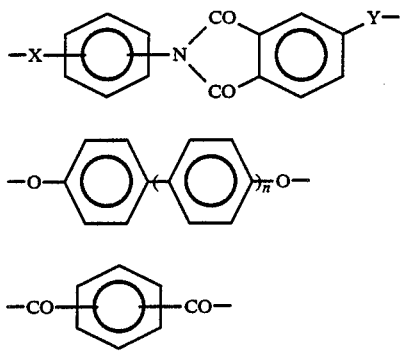

wherein X and Y are either —O— or —CO— and are either identical with or different from each other, n is an integer of 0 or 1, X group and imide group in unit II are present at para or meta position to each other, two carbonyl groups in unit IV are present at para or meta position to each other, and each end of units I, II, III, and IV is bonded to another end through ester bond, and wherein the polyimide ester has a melt viscosity of 1.0 to $1.0 \times 10^5$ Pa·s measured at a shear stress of 0.025 MPa and a temperature of 300° to 400° C.

2. The thermoplastic wholly aromatic polyimide ester of claim 1 wherein X is —O—, Y is —CO—, the mole ratio of (unit I+unit II): (unit III+unit IV) is 20:80 to 90:10, the mole ratio of unit I:unit II is 0.1:99.9 to 99.9:0.1, and the mole ratio of unit III:unit IV is substantially 1:1.

3. The thermoplastic wholly aromatic polyimide ester of claim 2 wherein the mole ratio of unit II:(unit I+unit III+unit IV) is 0.1:99.9 to 30:70.

4. The thermoplastic wholly aromatic polyimide ester of claim 1 wherein X is —CO—, Y is —CO—, the mole fraction of unit I is 20 to 80 mole %, the mole fraction of unit II is 0.1 to 30 mole %, the mole fraction of unit III is 10 to 40 mole %, and the mole fraction of unit IV is 0.1 to 40 mole %.

5. The thermoplastic wholly aromatic polyimide ester of claim 1 wherein X is —O—, Y is —O—, and the mole fraction of unit II is 0.1 to 30 mole %.

6. The thermoplastic wholly aromatic polyimide ester of claim 1 wherein X is —CO—, Y is —O—, and the mole fraction of unit II is 0.1 to 30 mole %.

7. A process for producing a thermoplastic wholly aromatic polyimide ester consisting essentially of structural units represented by the general formulas I, II', III, and IV:

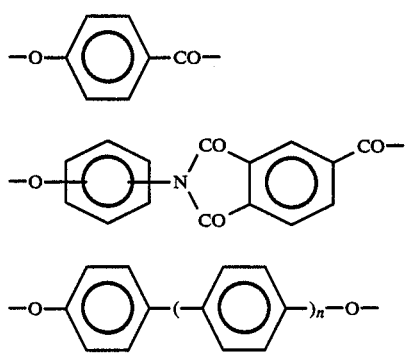

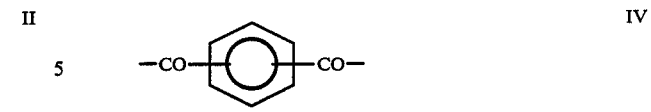

wherein n is an integer of 0 or 1, —O— and imide group in unit II' are present at para or meta position to each other, two carbonyl groups in unit IV are present at para or meta position to each other, each end of units I, II', III, and IV is bonded to another end through ester bond, and the mole ratio of (unit I+ unit II'):(unit III+unit IV) is 20:80 to 90:10, the mole ratio of unit I:unit II' is 0.1:99.9 to 99.9:0.1, and the mole ratio of unit III:unit IV is substantially 1:1, and wherein the polyimide ester has a melt viscosity of 1.0 to $1.0 \times 10^5$ Pa·s measured at a shear stress of 0.025 MPa and a temperature of 300° to 400° C., which process comprises:
reacting a compound Ia, a compound IIa, a compound IIIa, and a compound IVa represented by the general formulas respectively:

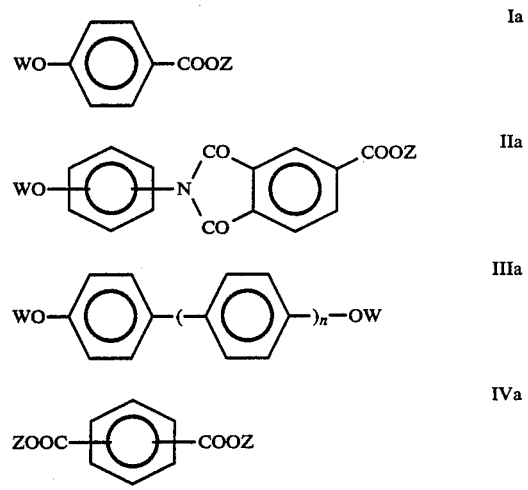

wherein n is an integer of 0 or 1, each W is independently selected from hydrogen or RCO—, R being, independently, a hydrocarbon group of 1 to 18 carbon atoms, each Z is independently selected from hydrogen or hydrocarbon groups of 1 to 18 carbon atoms, WO— group and imide group in compound IIa are present at para or meta position to each other, two carbonyl groups in compound IVa are present at para or meta position to each other, in such amounts that the mole ratio of (compound Ia+compound IIa):(compound IIIa+compound IVa) is 20:80 to 90:10, the mole ratio of compound Ia:compound IIa is 0.1:99.9 to 99.9:0.1, and the mole ratio of compound IIIa:compound IVa is substantially 1:1, so that one or more compounds each represented by the general formula:

W—O—Z are eliminated.

8. A process for producing a thermoplastic wholly aromatic polyimide ester consisting essentially of structural units represented by the general formulas I, II', III, and IV:

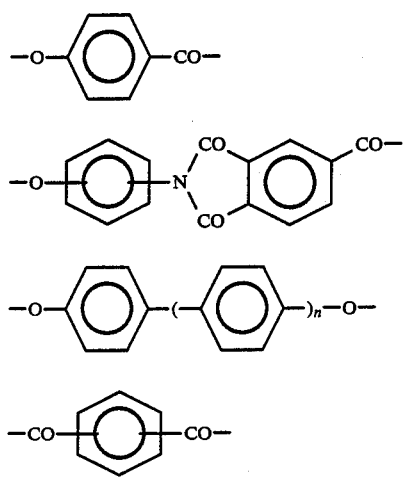

wherein n is an integer of 0 or 1, —O— and imide group in unit II' are present at para or meta position to each other, two carbonyl groups in unit IV are present at para or meta position to each other, each end of units I, II', III, and IV is bonded to another end through ester bond, and the mole ratio of (unit I+unit II'):(unit III+unit IV) is 20:80 to 90:10, the mole ratio of unit I:unit II' is 0.1:99.9 to 99.9:0.1, and the mole ratio of unit III:unit IV is substantially 1:1, and wherein the polyimide ester has a melt viscosity of 1.0 to $1.0 \times 10^5$ Pa·s measured at a shear stress of 0.025 MPa and a temperature of 300° to 400° C., which process comprises:

reacting a compound Ia, a compound IIb, a compound IIIa, and a compound IVa represented by the general formulas respectively:

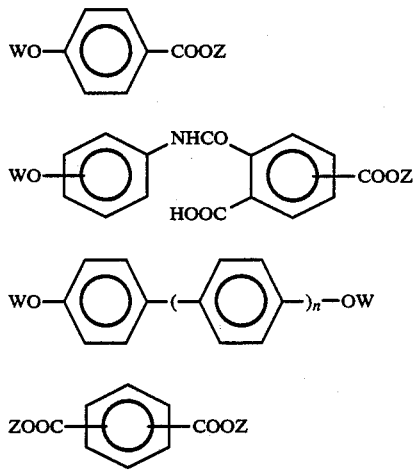

wherein n is an integer of 0 or 1, each W is independently selected from hydrogen or RCO—, R being independently a hydrocarbon group of 1 to 18 carbon atoms, each Z is independently selected from hydrogen or hydrocarbon groups of 1 to 18 carbon atoms, WO— group and amide group in compound IIb are present at para or meta position to each other, —COOZ group and hydroxyl group in compound IIb are at para or meta position to each other, and two carbonyl groups in compound IVa are present at para or meta position to each other, in such amounts that the mole ratio of (compound Ia+compound IIb):(compound IIIa+compound IVa) is 20:80 to 90:10, the mole ratio of compound Ia:compound IIb is 0.1:99.9 to 99.9:0.1. and the mole ratio of compound IIIa:compound IVa is substantially 1:1, so that compound IIb is imide-cyclized and one or more compounds represented by the general formula:

W—O—Z are eliminated.

9. A process for producing a thermoplastic wholly aromatic polyimide ester consisting essentially of structural units represented by the general formulas I, II", III, and IV:

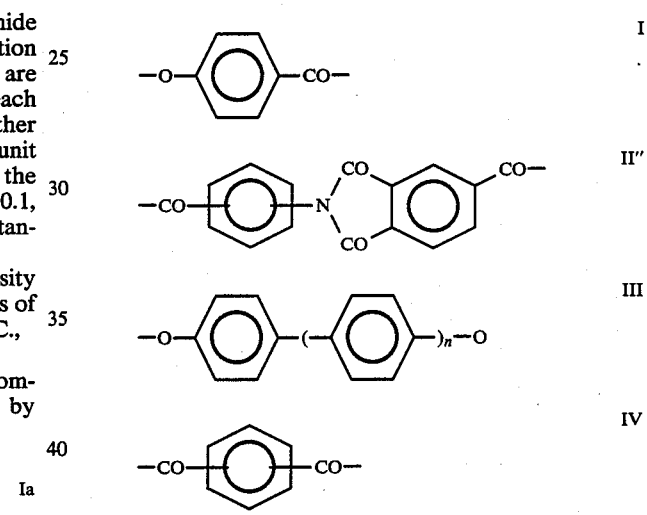

wherein n is an integer of 0 to 1, —CO— group and imide group in unit II" are present at para or meta position to each other, two carbonyl group in unit IV are present at para or meta position to each other, each end of units I, II", III, and IV is bonded to another end through ester bond, the mole fraction of unit I is 20 to 80 mole %, the mole fraction of unit II" is 0.1 to 30 mole %, the mole fraction of unit III is 10 to 40 mole %, and the mole fraction of unit IV is 0.1 to 40 mole %, and wherein the polyimide ester has a melt viscosity of 1.0 to $1.0 \times 10^5$ Pa·s measured at a shear stress of 0.025 MPa and a temperature of 300° to 400° C., which process comprises:

reacting a compound Ia, a compound IIc, a compound IIIa, and a compound IVa represented by the general formulas respectively:

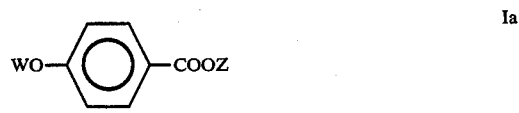

-continued

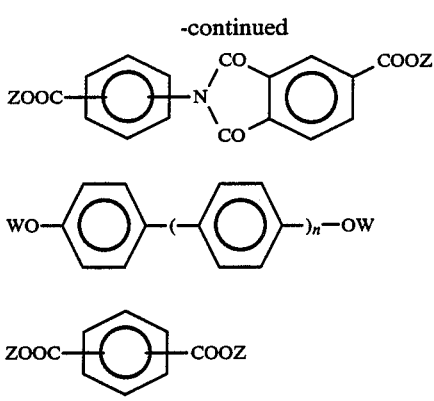

wherein n is an integer of 0 or 1, each W is independently selected from hydrogen or RCO—, R being independently a hydrocarbon group of 1 to 18 carbon atoms, each Z is independently selected from hydrogen or hydrocarbon groups of 1 to 18 carbon atoms, ZOOC— group and imide group in compound IIc are present at para or meta position to each other, two carbonyl groups in compound IVa are present at para or meta position to each other, in amounts of 20 to 80 mole % of compound Ia, 0.1 to 30 mole % of compound IIc, 10 to 40 mole % of compound IIIa, and 0.1 to 40 mole % of compound IVa, so that one or more compounds represented by the general formula:

W—O—Z are eliminated.

10. A process for producing a thermoplastic wholly aromatic polyimide ester consisting essentially of structural units represented by the general formulas I, II'', III, and IV:

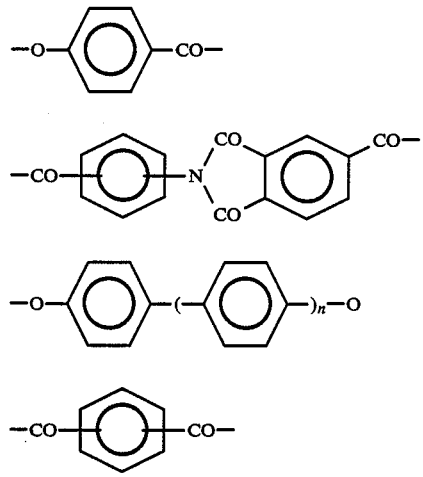

wherein n is an integer of 0 or 1, —CO— group and imide group in unit II'' are present at para or meta position to each other, two carbonyl groups in unit IV are present at para or meta position to each other, each end of units I, II'', III, and IV is bonded to another end through ester bond, the mole fraction of unit I is 20 to 80 mole %, the mole fraction of unit III II'' is 0.1 to 30 mole %, the mole fraction of unit III is 10 to 40 mole %, and the mole fraction of unit IV is 0.1 to 40 mole %, and wherein the polyimide ester has a melt viscosity of 1.0 to $1.0 \times 10^5$ Pa·s measured at a shear stress of 0.025 MPa and a temperature of 300° to 400° C., which process comprises:

reacting a compound Ia, a compound IId, a compound IIIa, and a compound IVa represented by the general formulas respectively:

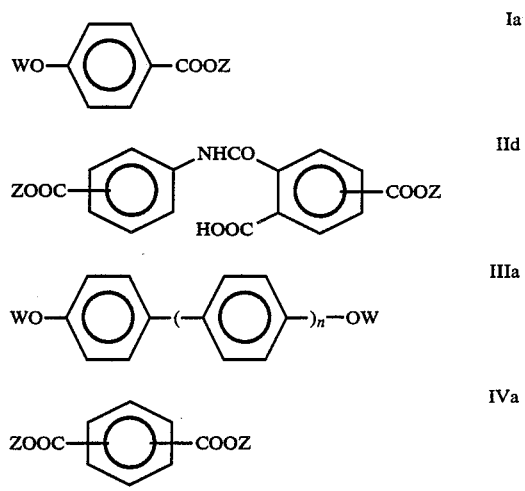

wherein n is an integer of 0 to 1, each w is independently selected from hydrogen or RCO—, R being independently a hydrocarbon group of 1 to 18 carbon atoms, each Z is independently selected from hydrogen or hydrocarbon groups of 1 to 18 carbon atoms, the left-hand ZOOC— group and amide group in compound IId are present at para or meta position to each other, the other ZOOC— group and hydroxyl group in compound IId are present at para or meta position to each other, and two carbonyl groups in compound IVa are present at para or meta position to each other, in amounts of 20 to 80 mole % of compound Ia, 0.1 to 30 mole % of compound IId, 10 to 40 mole % of compound IIIa, and 0.1 to 40 mole % of compound IVa, so that compound IId is imide-cyclized and one or more compounds represented by the general formula:

W—O—Z are eliminated.

* * * * *